US012599108B2

(12) United States Patent
Tang et al.

(10) Patent No.: US 12,599,108 B2
(45) Date of Patent: Apr. 14, 2026

(54) PET CAGE

(71) Applicant: Goodbaby Child Products Co. Ltd,
Kunshan (CN)

(72) Inventors: Ming Tang, Kunshan (CN); Zhou Zheng, Kunshan (CN); Jiapei He, Kunshan (CN)

(73) Assignee: Goodbaby Child Products Co. Ltd,
Kunshan (CN)

( * ) Notice: Subject to any disclaimer, the term of this patent is extended or adjusted under 35 U.S.C. 154(b) by 49 days.

(21) Appl. No.: 18/614,328

(22) Filed: Mar. 22, 2024

(65) Prior Publication Data

US 2024/0260537 A1 Aug. 8, 2024

(30) Foreign Application Priority Data

| Mar. 24, 2023 | (CN) | .......................... | 202320613294.X |
| May 30, 2023 | (CN) | .......................... | 202310622522.4 |
| May 30, 2023 | (CN) | .......................... | 202321341489.X |

(51) Int. Cl.
*A01K 1/03* (2006.01)
(52) U.S. Cl.
CPC .................................... *A01K 1/033* (2013.01)
(58) Field of Classification Search
CPC ........ A01K 1/033; A01K 1/0245; A01K 1/03; A01K 1/035; A01K 31/08
See application file for complete search history.

(56) References Cited

U.S. PATENT DOCUMENTS

| 4,009,543 | A | * | 3/1977 | Smrt | ...................... | E04B 1/3211 |
| | | | | | | 52/81.3 |
| 4,194,851 | A | * | 3/1980 | Littlefield | ............. | E04B 1/3211 |
| | | | | | | 52/81.3 |
| 5,497,728 | A | * | 3/1996 | Watanabe | .............. | A01K 1/033 |
| | | | | | | 119/452 |
| 6,606,964 | B2 | * | 8/2003 | Marchioro | ............. | A01K 31/08 |
| | | | | | | 119/474 |
| 7,316,203 | B2 | * | 1/2008 | Marchioro | ............. | A01K 31/08 |
| | | | | | | 119/474 |

(Continued)

FOREIGN PATENT DOCUMENTS

| CN | 1169273 A | 1/1998 |
| CN | 112450558 A | 3/2021 |

(Continued)

*Primary Examiner* — Katelyn T Truong
(74) *Attorney, Agent, or Firm* — MUNCY, GEISSLER, OLDS & LOWE, P.C.

(57) ABSTRACT

A pet cage includes a plurality of side frames defining a containing space; the plurality of side frames at least includes a first side frame, a second side frame and a third side frame; a connecting pore is defined by the first side frame, the second side frame and the third side frame; and the connecting pore is communicated with the containing space. The pet cage further includes coupling assembly, wherein the coupling assembly has an assembled state and a disassembled state. When the coupling assembly is in the disassembled state, the coupling assembly is separable from the connecting pore; and when the coupling assembly is in the assembled state, at least part of the coupling assembly is located in the connecting pore. The first side frame, the second side frame and the third side frame are located and connected together through the coupling assembly.

8 Claims, 20 Drawing Sheets

(56)  References Cited

U.S. PATENT DOCUMENTS

| | | | |
|---|---|---|---|
| 12,207,621 B2 * | 1/2025 | Tuthill ................ | A01K 1/0245 |
| 2002/0117118 A1 * | 8/2002 | Marchioro ............ | A01K 31/06 |
| | | | 119/474 |
| 2017/0122350 A1 * | 5/2017 | Link ..................... | F16B 5/0642 |
| 2023/0083124 A1 * | 3/2023 | Tuthill ................ | A01K 1/0245 |
| | | | 119/496 |

FOREIGN PATENT DOCUMENTS

| | | | | | |
|---|---|---|---|---|---|
| CN | 218389244 | U | | 1/2023 | |
| CN | 116602225 | A | | 8/2023 | |
| CN | 219919954 | U | | 10/2023 | |
| CN | 220528926 | U | | 2/2024 | |
| DE | 3007920 | A1 * | | 9/1981 | |
| GB | 2587638 | A * | 4/2021 | ............ A01K 1/032 |
| WO | WO-2021064125 | A2 * | 4/2021 | ........... A01K 1/0245 |

* cited by examiner

200

210

210

220

220

230

210

210

PET CAGE

CROSS-REFERENCE TO RELATED APPLICATIONS

This application claims priority from and benefit of the filing date of Chinese patent filing No. CN202321341489.X and CN202310622522.4 both filed on May 30, 2023 and Chinese patent filing No. CN202320613294.X filed on Mar. 24, 2023, and the entire disclosure of each of said prior applications is hereby incorporated by reference into the present specification.

BACKGROUND

Pet cages, which are used to limit the space for pets to move around and provide a comfortable "room" for pets, are indispensable daily necessities for pet owners. At present, many pet cages on the market have cage bodies that cannot be folded, such that the pet cages can only be kept in a cuboid unfolded state when packed, transported or stored. Especially for some pet cages used to accommodate large pets, the cage bodies in the unfolded state occupy extremely the space, and have low structural strength, which is not only inconvenient for storage and increases the cost of storage and transportation, but also is easy to be damaged by extrusion under force in the stacking or carrying process.

There are also some cages that can be folded and/or disassembled in a way that allows different side frames to be stacked and folded together when not in use, thereby reducing the size. In the prior art, different pet cages may be folded in different ways, and some of them have complex folding structures, cumbersome folding actions, and more movable joints, resulting in poor stability of cage bodies after unfolding. There are also some pet cages having cage bodies that can be disassembled into independent side frames, and a plurality of side frames can be stacked when not in use; and when they need to be used, the side frames can be spliced and assembled by a user one by one. The most common way to assemble the side frames is to use bolts or screws for connection, but this requires the help of external tools such as screwdrivers. In addition, the assembly and disassembly of a plurality of screws one by one is more time-consuming and laborious. How to properly store a large number of screws with small sizes after disassembly is also a problem, resulting in many inconveniences.

SUMMARY

In views of the defects of the prior art, an object of the invention is to provide a pet cage which is stable in structure and convenient to assemble and disassemble.

To fulfill said object, the invention adopts the following technical solutions.

A pet cage includes a plurality of side frames, wherein a containing space is defined by the plurality of side frames; the plurality of side frames at least includes a first side frame, a second side frame and a third side frame; a connecting pore is defined by the first side frame, the second side frame and the third side frame; the connecting pore is communicated with the containing space; and the pet cage further includes coupling assembly, wherein each coupling assembly has an assembled state and a disassembled state;

when the coupling assembly is in the disassembled state, the coupling assembly is separable from the connecting pore; and when the coupling assembly is in the assembled state, at least part of the coupling assembly is located in the connecting pore; and the first side frame, the second side frame and the third side frame are located and connected together through the coupling assembly.

Due to the application of the above technical solutions, according to the pet cage provided by the invention, the coupling assembly enable a detachable connection among at least three side frames. The coupling assembly is simple in structure, convenient to assemble and disassemble, and stable in connection. A set of connecting assembles can be inserted into the connecting hole as a whole, without the needs for external tools or the separation of the coupling assembly into small parts during the assembly and disassembly. The coupling assembly can ensure the structural stability and durability of the pet cage in the assembled state, and can make the plurality of side frames of the pet cage separated from each other and then stacked neatly in the disassembled state. The coupling assembly themselves are also easy to store, which facilitates the pet cage for flat storage and ease of use.

BRIEF DESCRIPTION OF THE DRAWINGS

In order to more clearly illustrate the technical solutions of the invention, the accompanying drawings required to be used in the description of the embodiments are described below briefly.

FIG. 38 is another partial schematic sectional view of the coupling assembly and the frame body in FIG. 35, wherein

100—side frame; 100*a*—first side frame; 100*b*—second side frame; 100*c*—third side frame; 101—frame body; 1011—transverse strut; 1012—vertical strut; 1013—connecting strut; 102—protective net; 103—connecting pore; 104—containing space; 200—coupling assembly; 2001—rotation centerline; 210—first piece; 211—first main body; 212—first extension body; 213—first connecting portion; 213*a*—convex portion; 2131—matching groove; 214—guide pillar; 215—first positioning structure; 220—second piece; 221—second main body; 222—second extension body; 223—insertion groove; 223*a*—first groove; 223*b*—second groove; 230—third piece; 231—third main body;

232—third extension body; 233—connecting hole; 234—guiding groove; 235—second positioning structure; 236—limiting rib; 236*a*—coupling groove; 237—embedding portion; and 240—bolt.

DETAILED DESCRIPTION

The preferred embodiments of the invention are described in detail below in conjunction with the accompanying drawings, so that the advantages and features of the invention can be more easily understood by those skilled in the art.

Figure 1:
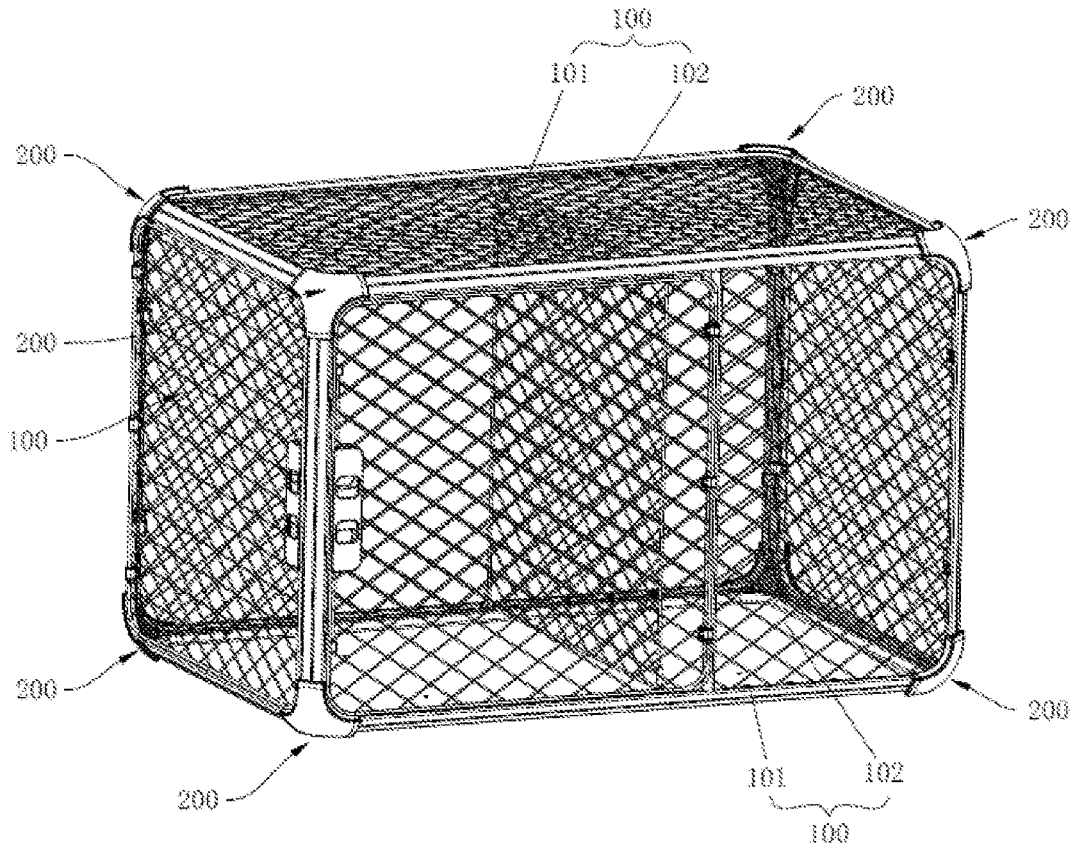
FIG. 1 is a three-dimensional schematic diagram of a pet cage in a specific embodiment of the invention.
Figure 2:
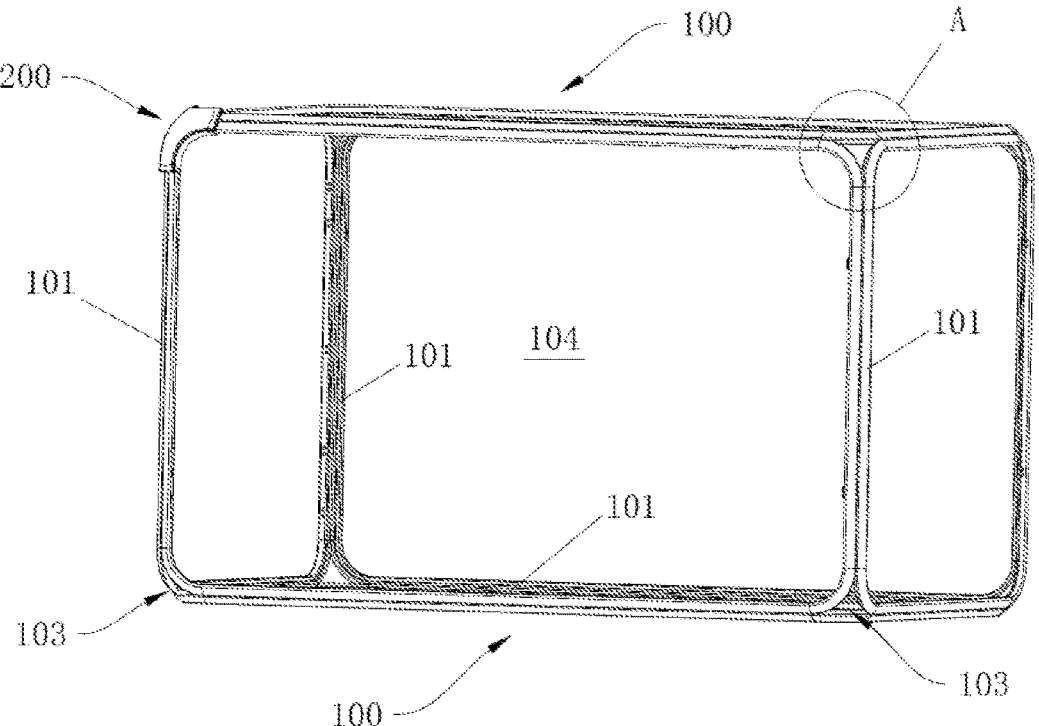
FIG. 2 is a three-dimensional schematic diagram of the pet cage in the present embodiment from which a protective net and some coupling assembly is hidden.
Figure 3:
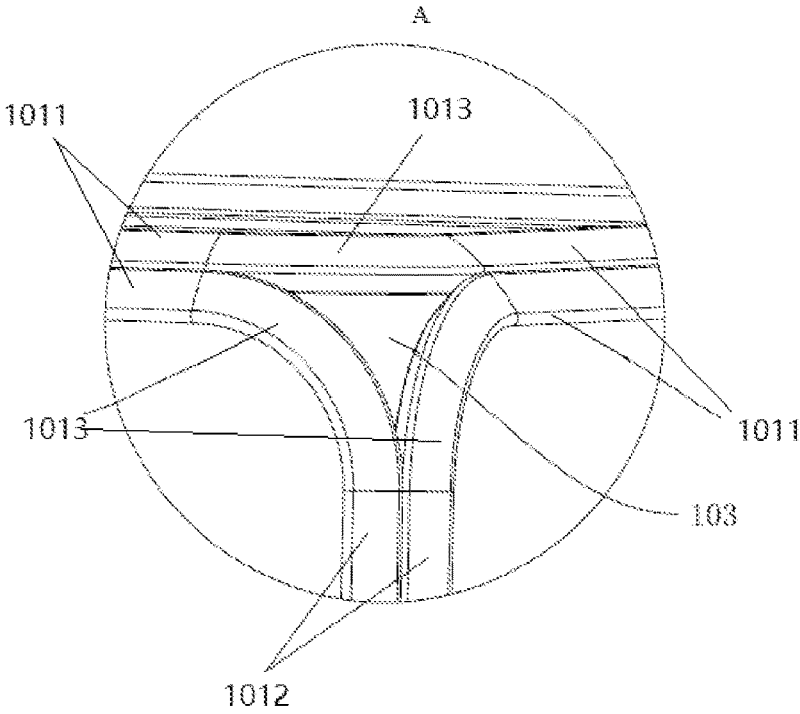
FIG. 3 is an enlarged schematic diagram at A in FIG. 2.
Figure 4:
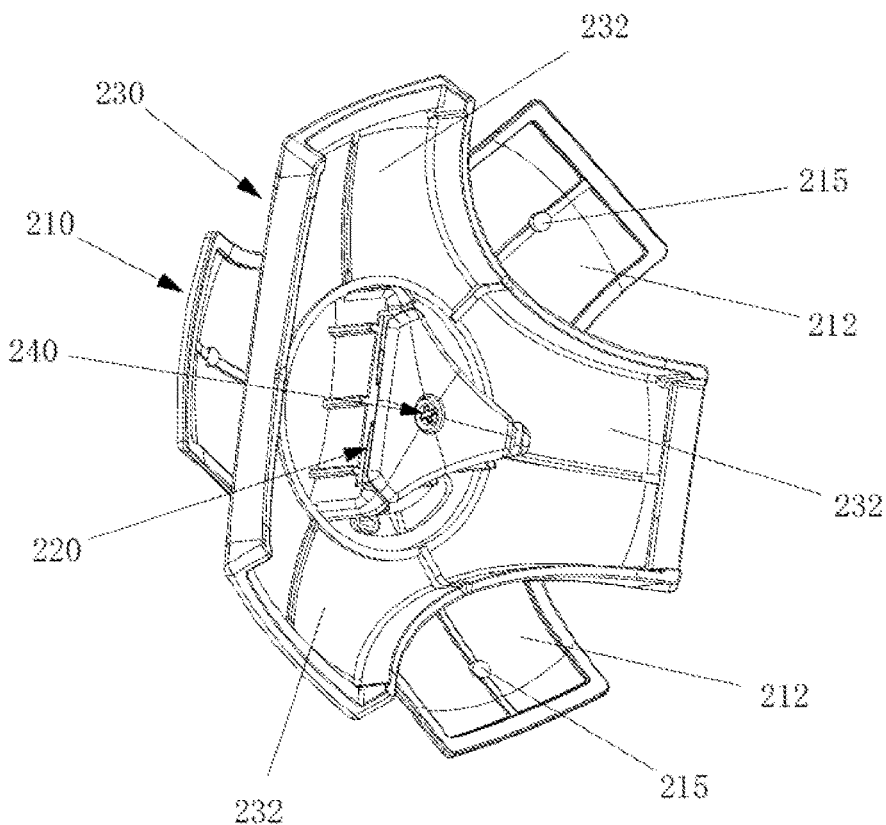
FIG. 4 is a three-dimensional schematic diagram of the coupling assembly in the present embodiment of the invention.
Figure 5:
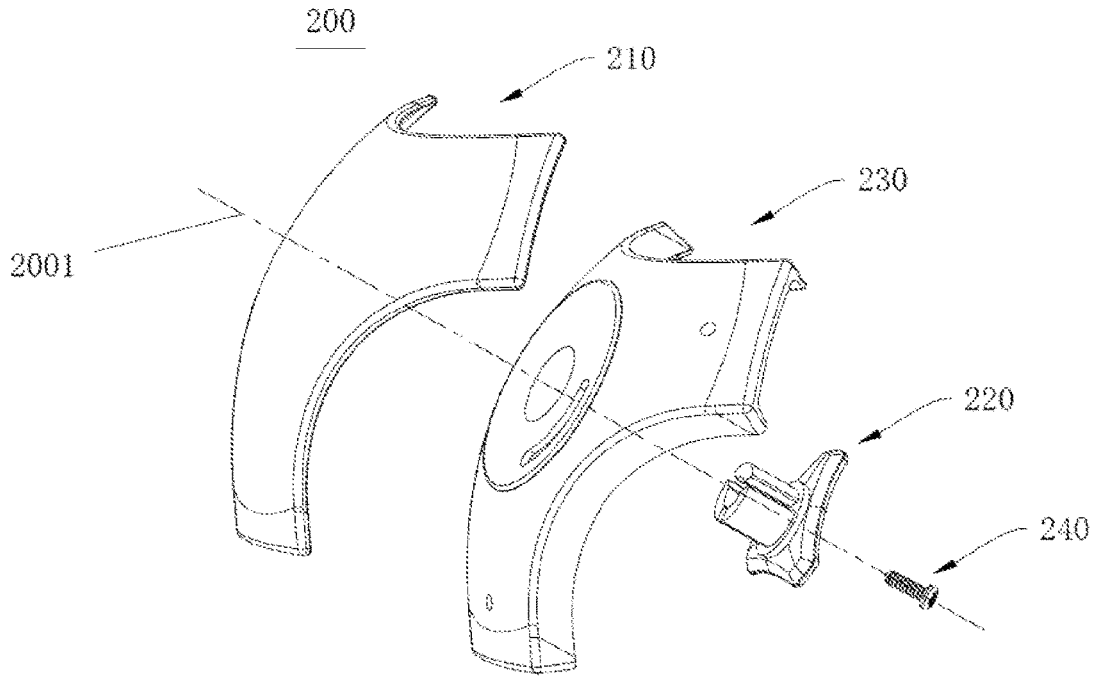
FIG. 5 is a schematic exploded view of the coupling assembly in the present embodiment.

As shown in FIG. 1 to FIG. 3, the present embodiment provides a pet cage. The pet cage includes a plurality of side frames 100, wherein a containing space 104 is defined by the plurality of side frames 100. The pet cage herein has six side frames 100. The six side frames 100 define a containing space 104 which is in a hexahedral shape as a whole. In the present embodiment, the containing space 104 is in a cuboid shape as a whole. In the present embodiment, the six side frames 100 have similar structures, and each include a rigid frame body 101 and a protective net 102 arranged on the frame body. A structural style of the protective net 102 is not specifically limited herein.

The frame body 101 is an annular frame body. In the present embodiment, the frame body 101 includes a pair of parallel transverse struts 1011 and a pair of parallel vertical struts 1012. The pair of transverse struts 1011 and the pair of vertical struts 1012 are connected sequentially to form the frame body 101 which is in a rectangular shape as a whole. The frame body 101 further includes a plurality of connecting struts 1013 which is configured to connect the adjacent transverse strut 1011 and vertical strut 1012 fixedly. An overall extending direction of the connecting struts 1013 intersects obliquely with an extending direction of the transverse struts 1011, and the overall extending direction of the connecting struts 1013 intersects obliquely with the vertical struts 1012. In the present embodiment, the connecting struts 1013 are in an arc shape as a whole and arch towards a center of the frame body 101.

As shown in FIG. 1 to FIG. 3, for the sake of description, in the present embodiment, the three side frames 100 spatially adjacent to each other are named a first side frame 100*a*, a second side frame 100*b* and a third side frame 100*c* respectively. The first side frame 100*a*, the second side frame 100*b* and the third side frame 100*c* are adjacent in pairs to each other and provided to extend in three directions, and the connecting struts 1013 in the three side frames are positionally opposite each other and jointly define a connecting pore 103. The connecting pore 103 is communicated with the containing space 104. The connecting pore 103 is specifically located in a corner of the cuboid containing space 104.

This pet cage further includes coupling assembly 200. The coupling assembly 200 are in detachable fit with the connecting pore 103. Each coupling assembly 200 has an assembled state and a disassembled state. When the coupling assembly 200 are in the assembled state, at least part of the coupling assembly 200 are located in the connecting pore 103, and the first side frame 100*a*, the second side frame 100*b* and the third side frame 100*c* are positioned and supported together through the coupling assembly 200. When the coupling assembly 200 are in the disassembled state, the coupling assembly 200 are separated from the connecting pore 103, so that the first side frame 100*a*, the second side frame 100*b* and the third side frame 100*c* can be separated from each other.

As shown in FIG. 1 to FIG. 3, in the present embodiment, each connecting strut 1013 is in a shape of a rounded rectangle. Therefore, a gap can be formed among every three adjacent frame bodies 101 to define the connecting pore 103. The connecting pore 103 is roughly triangular, and a set of coupling assembly 200 may be detachably provided in each connecting pore 103. The cuboid pet cage in the present embodiment includes eight connecting pores 103 in total, and correspondingly includes eight sets of coupling assembly in total. When the eight sets of coupling assembly 200 are all in the assembled state, the six side frames 100 of the pet cage can be fixedly connected all together to form a firm and stable cage body structure. When the eight sets of coupling assembly 200 are all in the disassembled state, the six side frames 100 can be separated from each other and independent of each other, and a user may stack a plurality of side frames 100 together according to needs, thereby facilitating packaging and transportation.

In other embodiments, it is also possible to provide the coupling assembly 200 only between part of side frames 100 of the pet cage, while other side frames 100 may be connected in existing connecting ways. In other embodiments, the pet cage may also be set as other geometric polyhedra, such as a tetrahedron, an octahedron or a dodecahedron. Regardless of the appearance shape, the pet cage includes a plurality of side frames 100 for defining the containing space 104, and at least three side frames 100 may be adjacent at one corner of the polyhedron. Therefore, the pet cage is also suitable for the coupling assembly 200 provided by the invention, wherein the structure of the coupling assembly 200 only needs to be adaptively adjusted, and the detachable connection among at least three adjacent side frames 100 can be realized likewise.

The connecting pore 103 is shown in FIG. 4 to FIG. 13. In the present embodiment, each coupling assembly 200 includes a first piece 210, a second piece 220 and a third piece 230. When the coupling assembly 200 are in the assembled state, part of the first piece 210 penetrates through the connecting pore 103, and both ends of the first piece 210 cooperate with the second piece 220 and the third piece 230 respectively, so that the connecting struts 1013 respectively corresponding to the first side frame 100*a*, the second side frame 100*b* and the third side frame 100*c* are simultaneously pressed between the second piece 220 and the third piece 230.

When the coupling assembly 200 are in the disassembled state, the first piece 210 is separable from the connecting pore 103.

A rotation centerline 2001 is provided in a penetration direction of the connecting pore 103. The first piece includes a first connecting portion 213 provided to extend towards the connecting pore 103. The first connecting portion 213 is capable of relatively rotating around the rotation centerline 2001 to cooperate with the connecting pore 103. The first piece 210 rotates between an assembled position and a disassembled position. When the first piece 210 is in the disassembled position, the first connecting portion 213 is capable of relatively moving in an extending direction of the rotation centerline 2001, such that the coupling assembly 200 in the disassembled state.

When the first piece 210 rotates to the assembled position, the first connecting portion 213 cooperates with the second piece 220 to limit the first piece 210 from moving in the extending direction of the rotation centerline 2001.

Specifically, the third piece 230 is provided between the first piece 210 and the second piece 220 in the extending direction of the rotation centerline 2001. When the coupling assembly 200 are in the assembled state, the first piece 210 and the third piece 230 are provided on one side of the connecting pore 103, and the second piece 220 is provided on the other side of the connecting pore 103. Specifically, at least part of the first piece 210 and the third piece 230 are located on the outer side of the containing space 104, and at least part of the second piece 220 is located on the inner side of the containing space 104, so that the user can assemble and disassemble the first piece 210 and the third piece 230 from the outer side of the pet cage.

In the present embodiment, the first piece 210 includes a first main body 211 provided to extend outside the frame body 101 and first connecting portions 213 provided on the first main body 211. In the assembled state, one end of the first connecting portion 213 away from the first main body 211 is provided to extend toward the connecting pore 103 and penetrate into the connecting pore 103.

The third piece 230 includes a connecting hole 233 adaptive with the first connecting portion 213, and the connecting hole 233 is positionally opposite to the connecting pore 103. In the assembled state, the first main body 211 abuts against one side of the third piece 230 away from the second piece 220, and one end of the first connecting portion 213 away from the first main body 211 sequentially penetrates through the connecting hole 233 and the connecting pore 103 to cooperate with the second piece 220.

A third main body 231 and a plurality of third extension bodies 232 provided to extend outward from the third main body 231 are formed on the third piece 230. Each third extension body 232 is provided with a coupling groove 236*a*. When the coupling assembly 200 is located in the assembled state, the two adjacent side frames 100*a* are coupled and fixed together by the third extension bodies 232.

Figure 12:
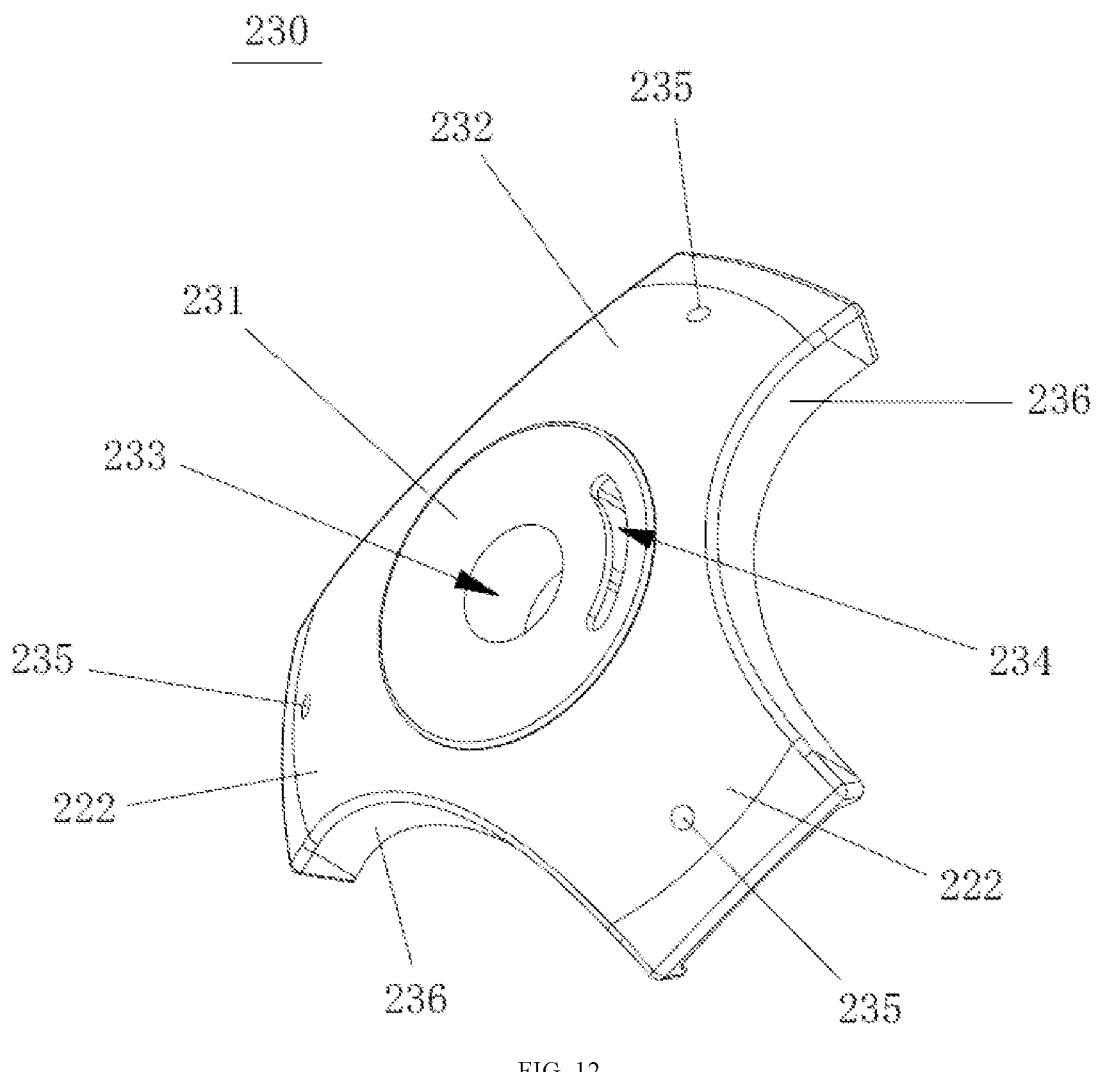
FIG. 12 is a three-dimensional schematic diagram of a third piece in the present embodiment.
Figure 13:
FIG. 13 is a three-dimensional schematic diagram of the third piece in the present embodiment from another perspective.
Figure 13:
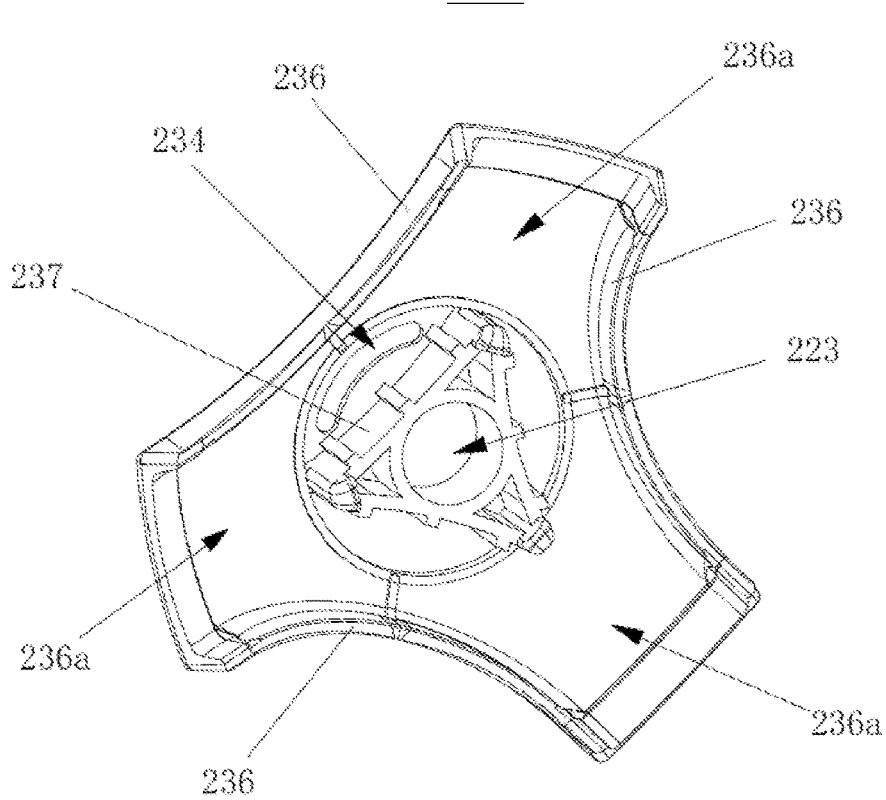

As shown in FIG. 12 and FIG. 13, in the present embodiment, three third extension bodies 232 are provided to extend outward from the third main body 231. Here, the three third extension bodies 232 are evenly spaced in a circumferential direction of the third main body 231, and an included angle between every two adjacent third extension bodies 232 is about 120°.

In the present embodiment, each third extension body 232 is provided with the coupling groove 236*a*. A limiting bar 236 is respectively provided on both sides of each third extension body 232 in a width direction, so that the coupling groove 236*a* capable of containing the widths of the two frame bodies 101 is formed between the two limiting bars 236. In the present embodiment, the two limiting ribs 236 located on the same side extend as a whole, so that the entire third piece 230 only has three arc-shaped limiting ribs 236. Therefore, the structure is simple and smooth. As shown in FIG. 17 to FIG. 20, when the coupling assembly 200 are in the assembled state, part of the frame body 101 of the first side frame 100*a* and part of the frame body 101 of the second side frame 100*b* are jointly coupled in the coupling groove 236*a* of one of the third extension bodies 232, the other part of the frame body 101 of the first side frame 100*a* and part of the frame body 101 of the third side frame 100*c* are jointly coupled in the coupling groove 236*a* of another third extension body 232, and the other part of the frame body 101 of the second side frame 100*b* and the other part of the frame body 101 of the third side frame 100*c* are jointly coupled in the coupling groove 236*a* of the third one of the third extension bodies 232. In this way, the third piece 230 is capable of positioning the three side frames 100 from the outer side of the containing space 104.

Figure 8:
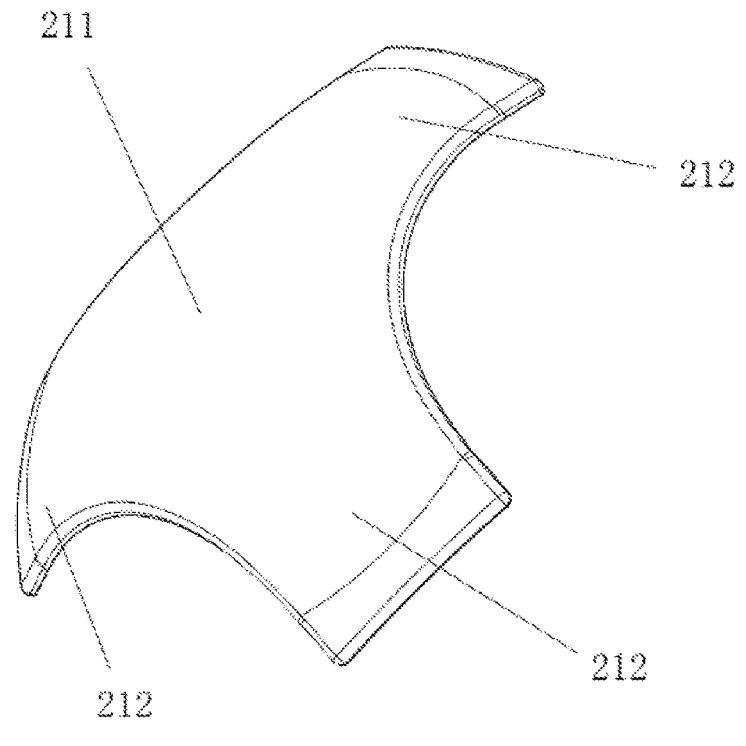
FIG. 8 is a three-dimensional schematic diagram of a first piece in the present embodiment.
Figure 9:
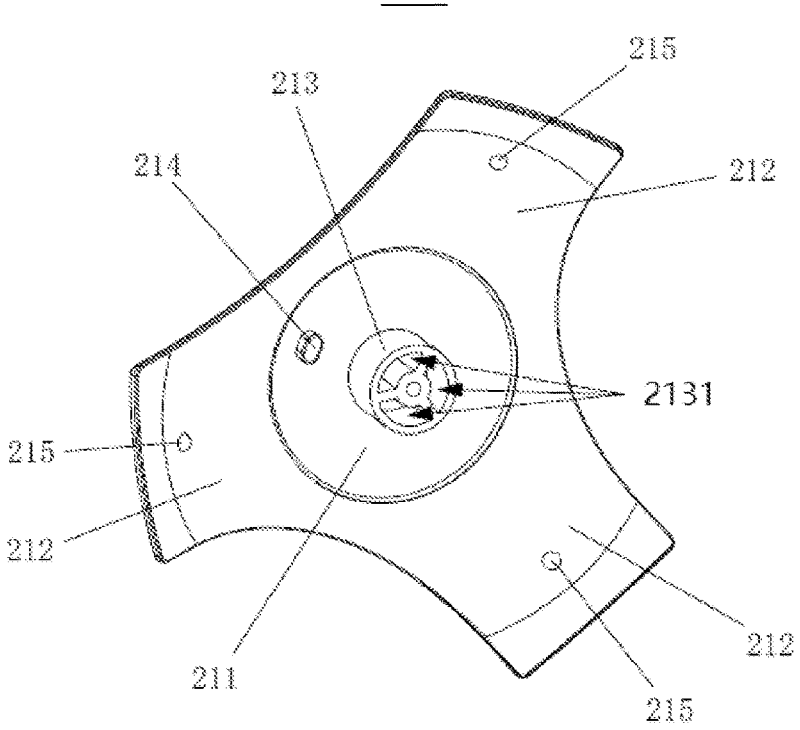
FIG. 9 is a three-dimensional schematic diagram of the first piece in the present embodiment from another perspective.

As shown in FIG. 8 and FIG. 9, in the present embodiment, the first piece 210 includes three first extension bodies 212. The three first extension bodies 212 are provided to extend outward from the first main body 211. Here, the three first extension bodies 212 are evenly spaced in a circumferential direction of the first main body 211, and an included angle between every two adjacent first extension bodies 212 is about 120°. In the assembled position, the first extension bodies 212 abut against the third main body 231, in order to limit the first connecting portion 213 from moving toward the containing space 104.

As shown in FIG. 8 to FIG. 13, one of the first piece 210 and the third piece 230 is provided with a guiding groove 234, and the other is provided with a guide pillar 214. The guide pillar 214 can be inserted into the guiding groove 234 in a relative sliding manner. An extending direction of the guiding groove 234 is an arc with the rotation centerline 2001 as a centerline. In the present embodiment, specifically, the guide pillar 214 is fixedly provided on the first piece 210. The guide pillar 214 protrudes from the first main body 211 to one side, and the guide pillar 214 and the first connecting portion 213 are located on the same side of the first main body 211. The third piece 230 is provided with a guiding groove 234, the guiding groove 234 is formed in the third main body 231, and a central angle of the arc where the extending direction of the guiding groove 234 is located is slightly greater than 60°. In this way, the guide pillar 214 and the guiding groove 234 cooperate with each other to provide guidance for the rotation of the first piece 210 relative to the third piece 230.

As shown in FIG. 8 to FIG. 13, in the present embodiment, the first piece 210 has a first positioning structure 215, the third piece 230 has a second positioning structure 235, and the first positioning structure 215 can be in damping fit with the second positioning structure 235. When the coupling assembly 200 is switched between the disassembled state and the assembled state, the first positioning structure 215 is out of fit from the second positioning structure 235, and the first piece 210 and the third piece 230 can be connected around the rotation centerline 2001 in a relative rotating manner. When the assembling assembly 200 is located in the assembled state, the first positioning structure 215 and the second positioning structure 235 cooperate with each other to limit the first piece 210 from rotating relative to the third piece 230. In the present embodiment, the first positioning structure 215 and the second positioning structure 235 may be specifically made of a high-friction material with certain elasticity such as rubber. The first positioning structure 215 is provided oppositely to the second positioning structure 235. The first positioning structure 215 is a damping protrusion that protrudes towards the third piece 230, the second positioning structure 235 is a damping groove in shape fit with the first positioning structure 215, so that when the damping protrusion falls into the damping groove, the damping protrusion and the damping groove contact each other to produce a larger frictional force, and the second positioning structure 235 can prevent the first positioning structure 215 from continuing to rotate. In the present embodiment, each first extension body 212 is provided with the first positioning structure 215, each third extension body 232 is provided with a second positioning structure 235, and three sets of first positioning structures 214 and second positioning structures 234 cooperate with each other to realize positioning when the first piece 210 rotates in place.

The first piece of 210 and the second piece of 220 have at least the following two cooperation modes.

In the first mode, the first piece 210 and the second piece 220 are fixedly connected together; the first side frame 100a, the second side frame 100b and the third side frame 100c are adjacent in pairs to each other; the second piece 220 includes a second main body 221 and second extension bodies 222 extending outward from the second main body 221; the first connecting portion 213 is fixedly connected to the second main body 221; an extending direction of the second extension bodies 222 intersects obliquely with or is approximately perpendicular to an extending direction of the first connecting portion 213; and when the first piece 210 is located in the assembled position, the second extension bodies 222 abut against the first side frame 100a, the second side frame 100b and the third side frame 100c at the same time.

The third extension bodies 222 are provided to extend into the containing space 104, and abut against the three adjacent side frames at the same time, such that the first connecting portions 213, which are fixedly connected to the second extension bodies 222, cannot move in a direction away from the containing space 104, and thus the three adjacent side frames are coupled and fixed between the second extension bodies 222 and the third piece 230.

Three second extension bodies 222 are provided. The three second extension bodies 222 are provided annularly with the second main body 221 as a center. When the first piece 210 is located in the assembled position, the three second extension bodies 222 abut against the first side frame 100a, the second side frame 100b and the third side frame 100c each other in a one-to-one correspondence manner, respectively.

When the first piece 210 is in the disassembled position, an entire outer contour of the three second extension bodies 222 and the second main body 221 is adaptive to the connecting pore 103, such that the second piece 220 is capable of penetrating through the connecting pore 103, thereby detaching the first connecting portion 213 from the connecting pore 103.

In the present embodiment, the second piece 220 is triangular as a whole. The three second extension bodies 222 are evenly spaced in a circumferential direction of the second main body 221. An included angle between every two adjacent second extension bodies 222 is about 120°. The connecting pore 103 is also triangular as a whole.

In order to better control the rotation of the second extension bodies 222, one end of each second extension body 222 away from the second main body 221 warps in a direction away from the connecting pore 103. The second extension bodies 222 can be provided to warp to play a guiding role in the rotation of the second piece 220. The second piece 220 rotates more smoothly from the disassembled position to the assembled position, and meanwhile the second piece can be pressed more tightly on the side frame 100.

A raised embedding portion 237 is provided on one side of the third main body 231. The embedding portion 237 is roughly triangular, so that the embedding portion 237 can be inserted into the connecting pore 103 in a shape fit mode. The connecting hole 233 penetrates through the third main body 231 and the embedding portion 237 in the extending direction of the rotation centerline 2001, so that the first connecting portion 213 can pass through this connecting hole 233 and be interconnected with the second connecting portion 223.

In order to facilitate the fixed connection of the first piece 210 and the second piece 220, three matching grooves 2131 are formed in one side of the first connecting portion 213 facing the second piece 220. The three matching grooves 2131 here are specifically spaced in the first connecting portion 213.

Figure 10:
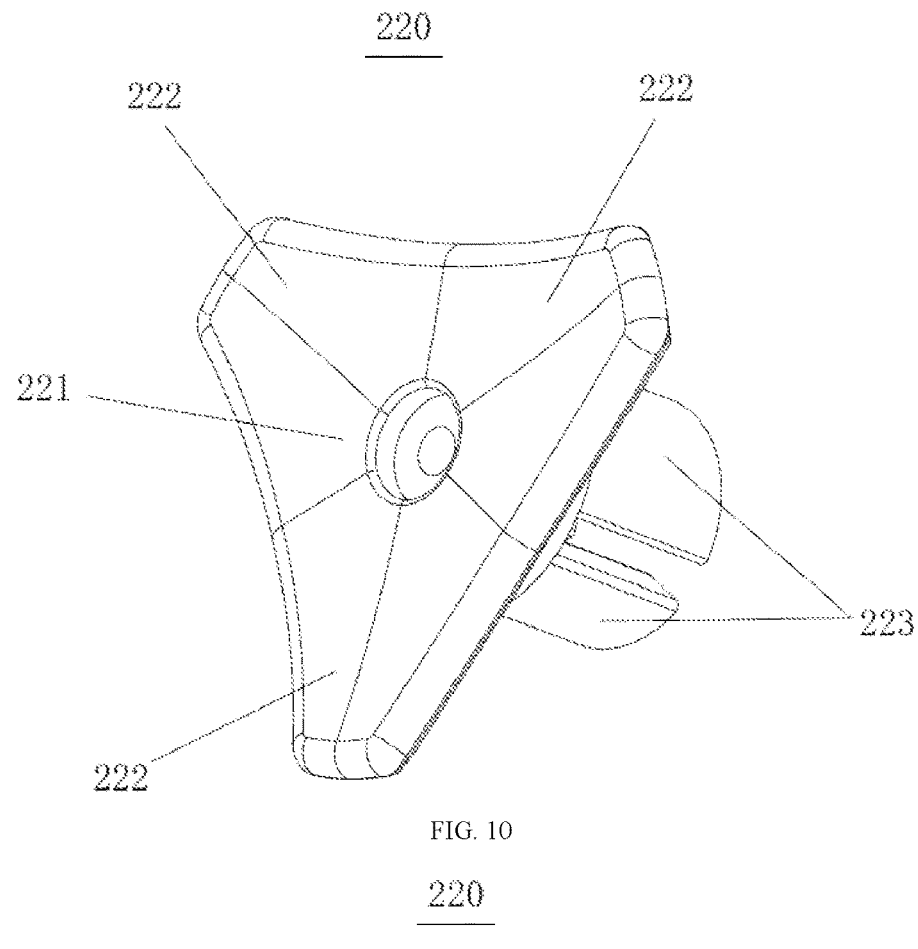
FIG. 10 is a three-dimensional schematic diagram of a second piece in the present embodiment.
Figure 11:
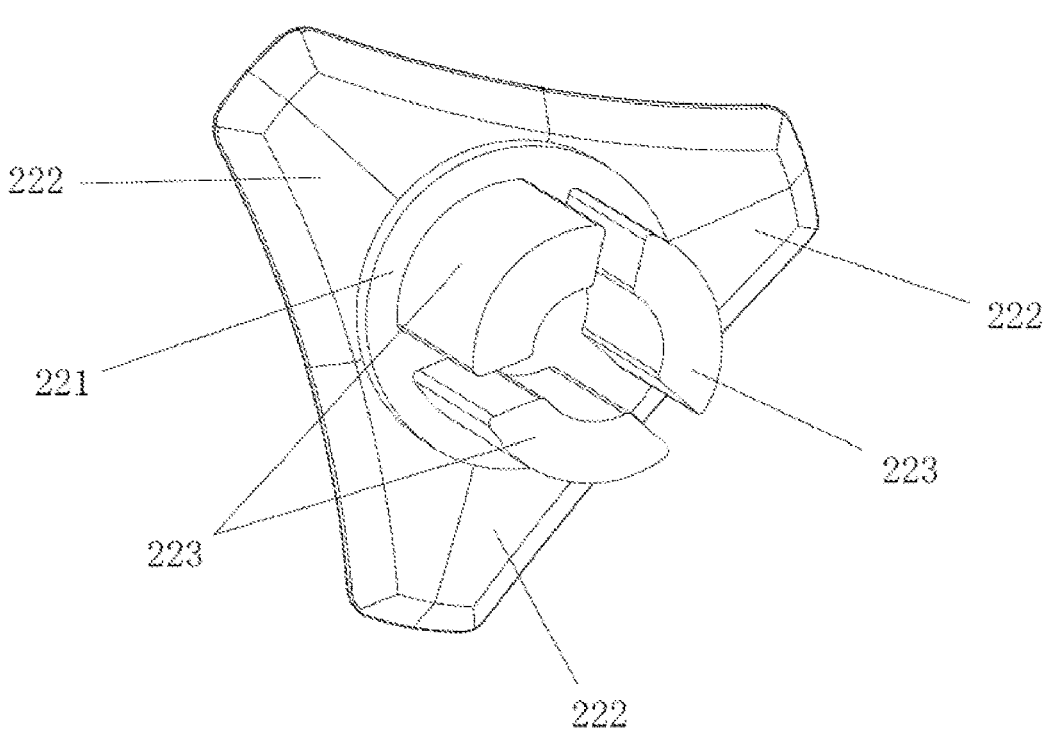
FIG. 11 is a three-dimensional schematic diagram of the second piece in the present embodiment from another perspective.

As shown in FIG. 10 and FIG. 11, the second piece 220 further includes second connecting portions 223. The second connecting portions 223 protrude from the second main body 221 to one side. When the coupling assembly 200 are in the assembled state, the second connecting portions 223 extend in a first direction. Corresponding to the three matching grooves 2131, three second connecting portions 223 are provided to be spaced. Each second connecting portion 223 can be inserted into one of the matching grooves 2131 in a shape fit manner, so that the first piece 210 and the second piece 220 cannot rotate relatively around the rotation centerline 2001. In the present embodiment, each coupling assembly 200 further includes a bolt 240. The bolt 240 is configured to connect the first piece 210 and the second piece 220 in a threaded manner, so that the first piece 210 and the second piece 220 are fixedly connected together.

Figure 6:
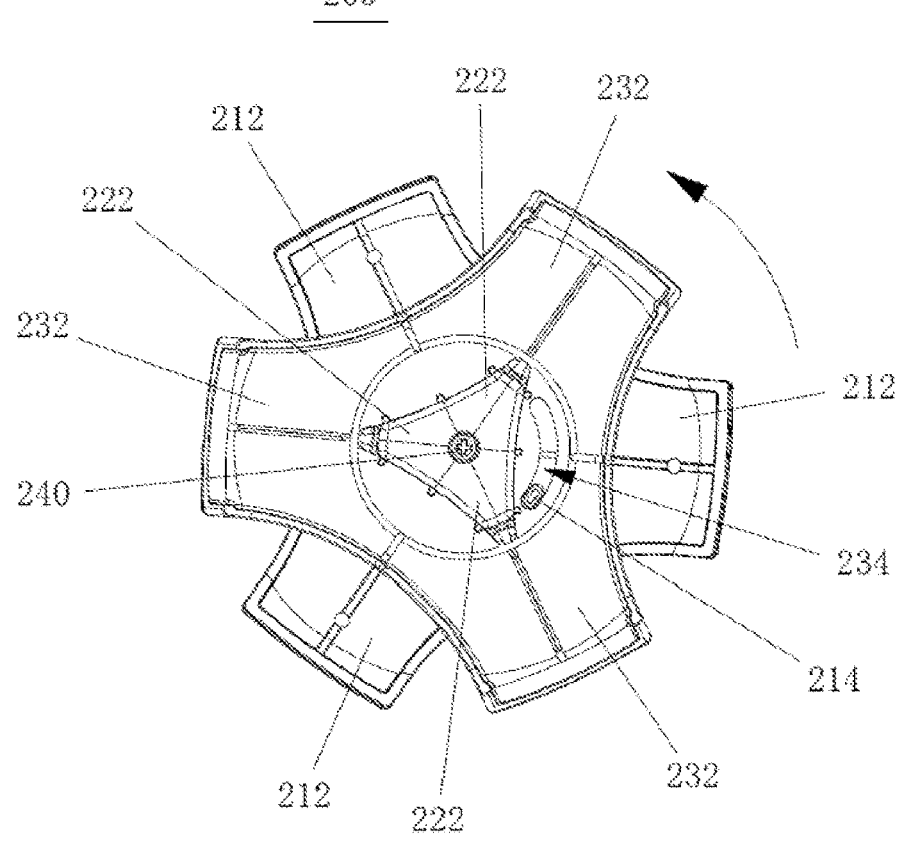
FIG. 6 is a schematic front view of the coupling assembly in the present embodiment, wherein a rotating member is in a first connected state.
Figure 7:
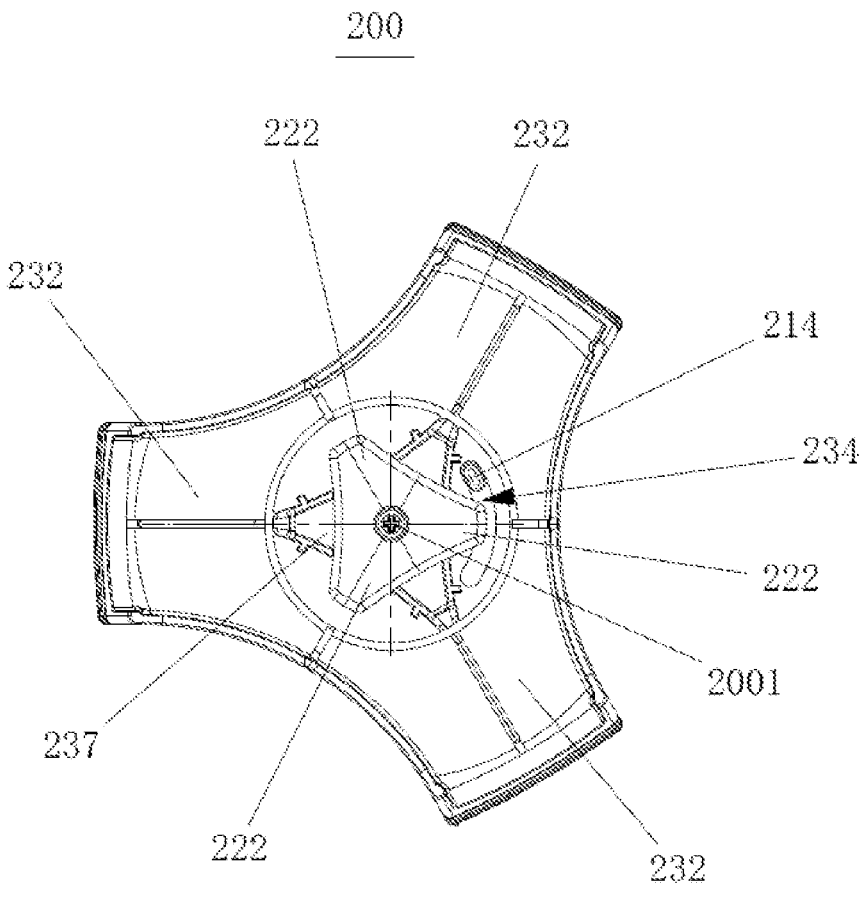
FIG. 7 is a schematic front view of the coupling assembly in the present embodiment, wherein the rotating member is in a second connected state.

As shown in FIG. 6 and FIG. 7, around the circumference of the rotation centerline 2001, the three first extension bodies 212 are spaced one by one from the three second extension bodies 222. In the present embodiment, the three first extension bodies 212 are evenly spaced from the three second extension bodies 222. Taking a plane perpendicular to the rotation centerline 2001 as a reference plane, the first piece 210 and the second piece 220 respectively have projections on this reference plane, and an included angle between a projection of each adjacent first extension body 212 and a projection of one second extension body 222 is about 60°.

The pet cage in which the first piece 210 and the second piece 220 cooperate in the first mode is assembled using the following method.

Figure 14:
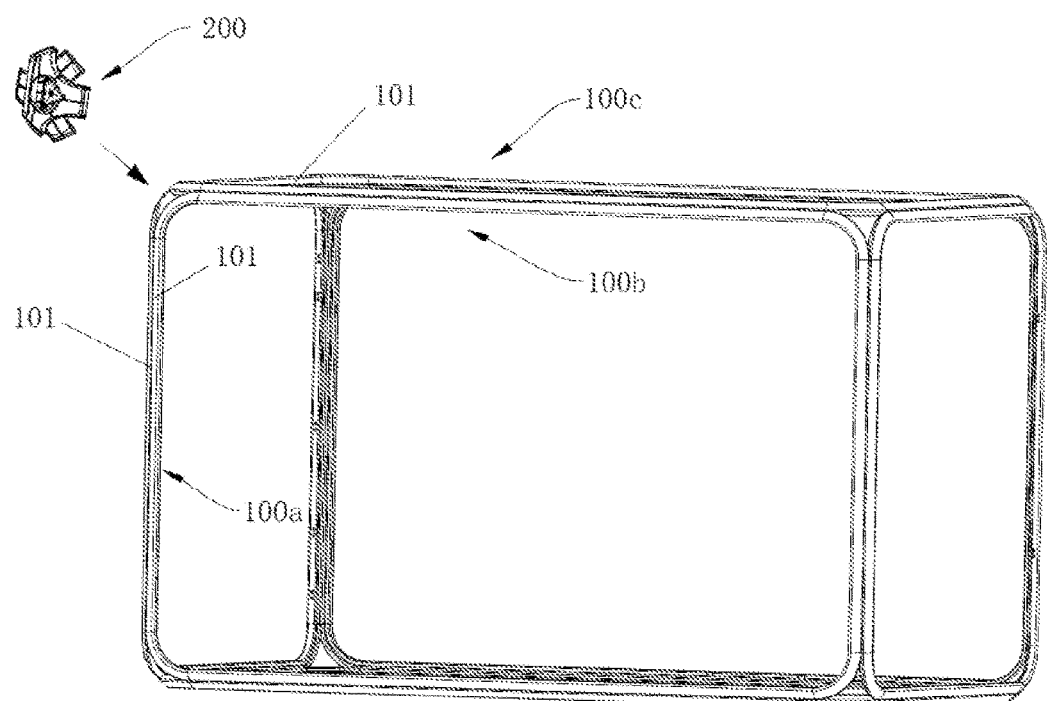
FIG. 14 is a three-dimensional schematic diagram of the coupling assembly in an assembling process in the present embodiment.
Figure 15:
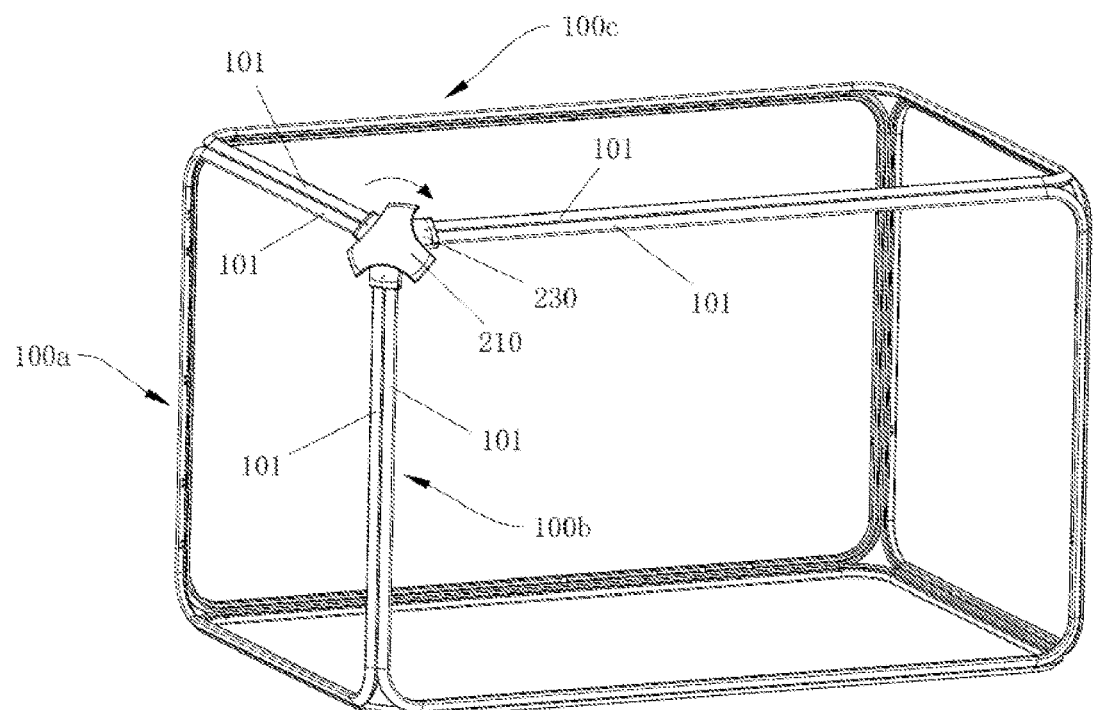
FIG. 15 is a three-dimensional schematic diagram of the coupling assembly in the assembling process in the present embodiment, wherein the rotating member is in the first connected state.
Figure 16:
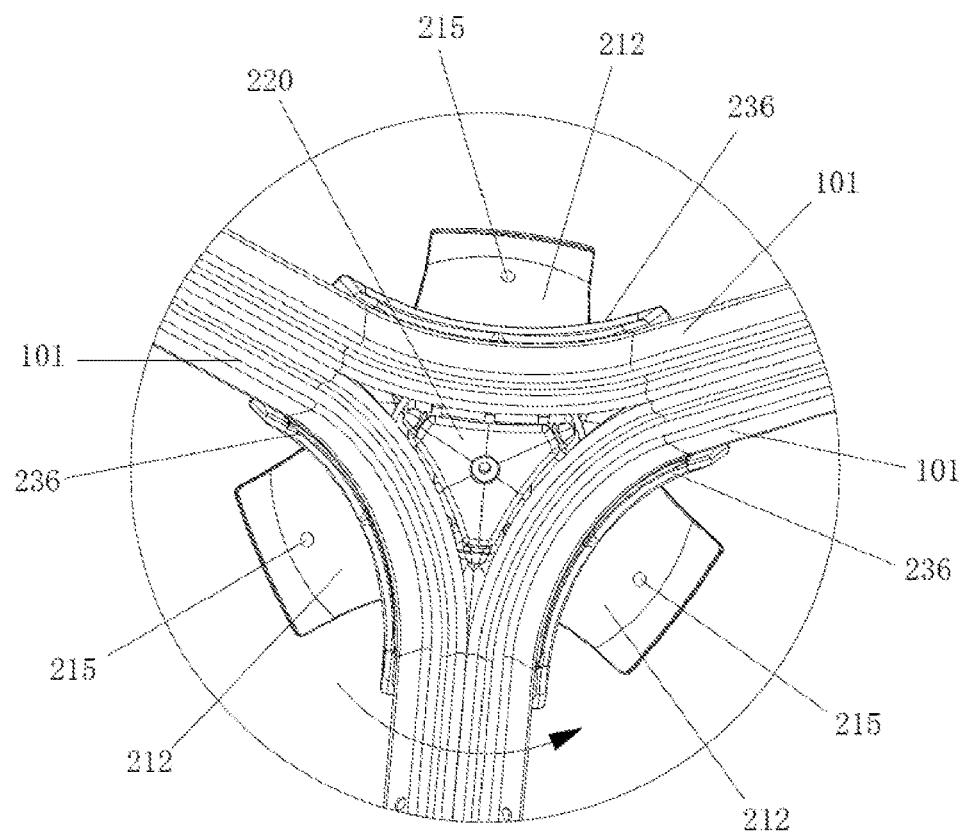
FIG. 16 is a partial three-dimensional schematic diagram of the coupling assembly in FIG. 15 from another perspective.
Figure 17:
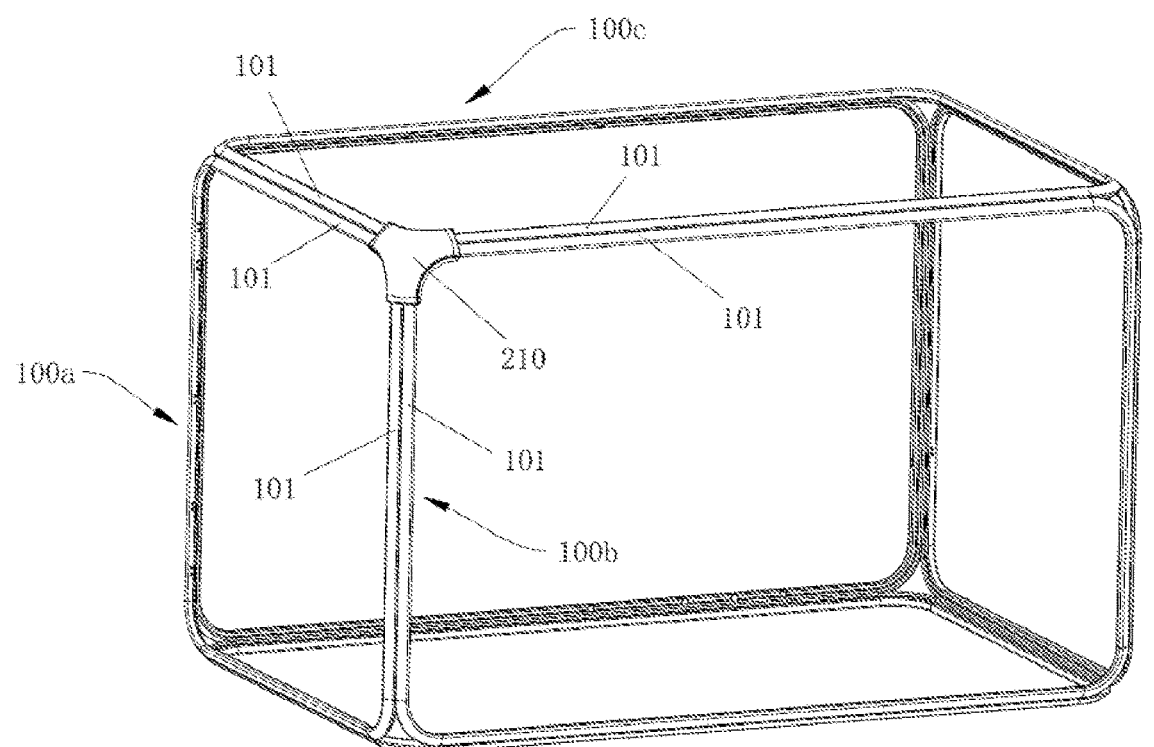
FIG. 17 is a three-dimensional schematic diagram of the coupling assembly in an assembled state in the present embodiment.
Figure 18:
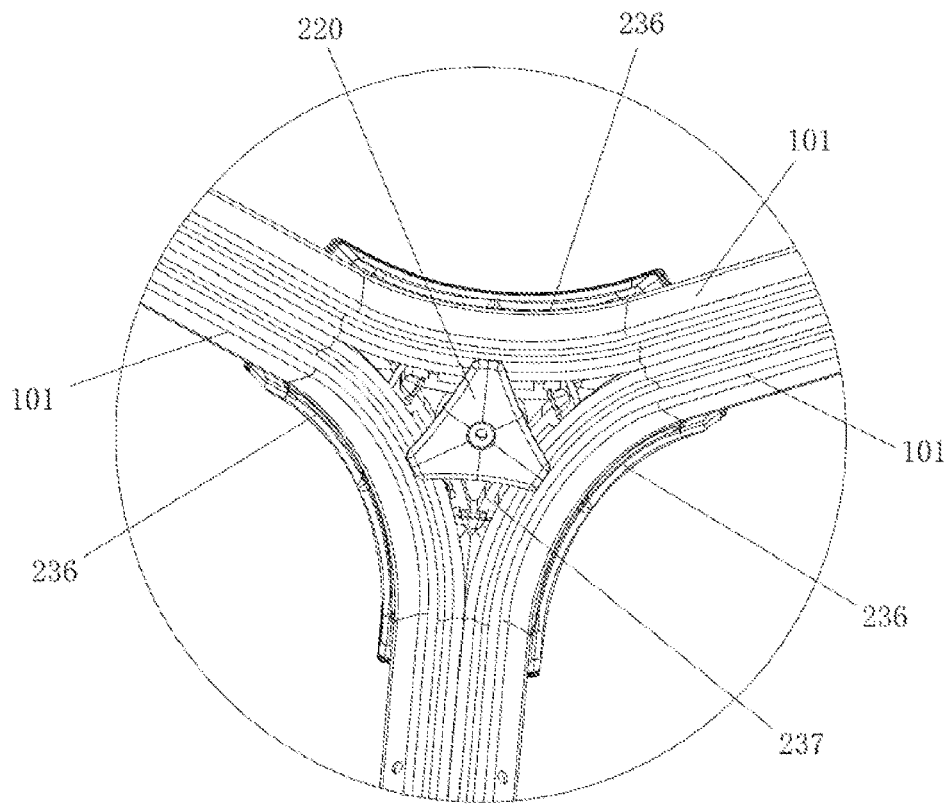
FIG. 18 is a partial three-dimensional schematic diagram of the coupling assembly in FIG. 17 from another perspective.
Figure 19:
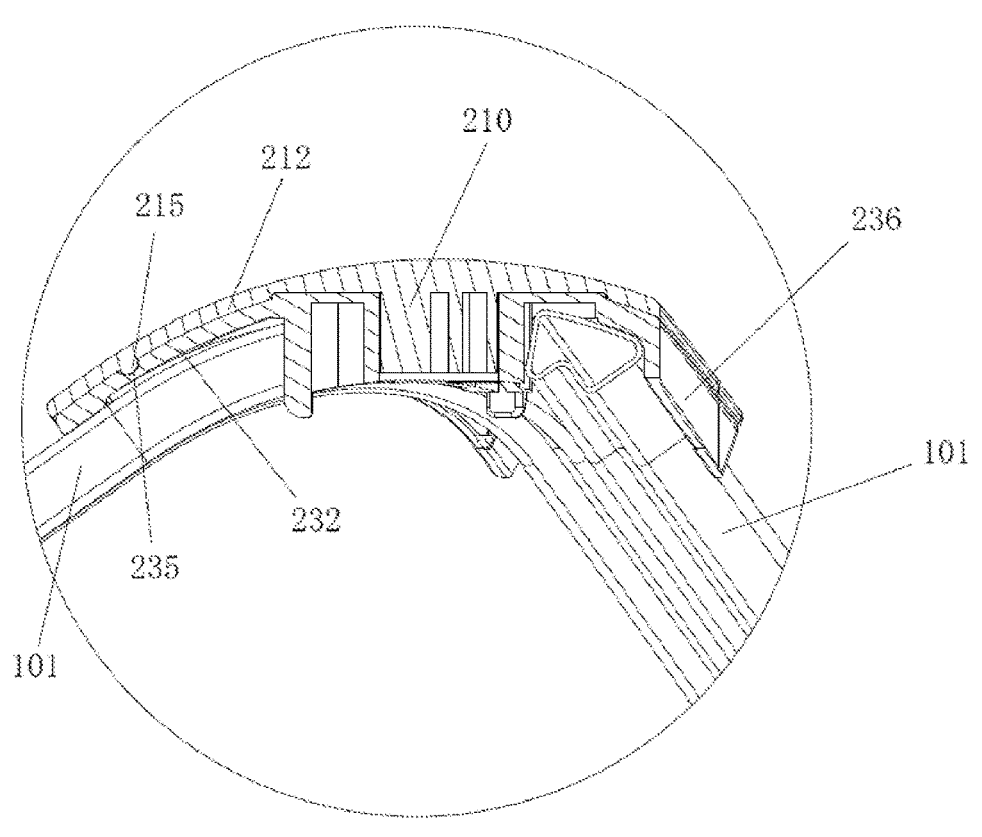
FIG. 19 is a partial schematic sectional view of the coupling assembly in FIG. 17.
Figure 20:
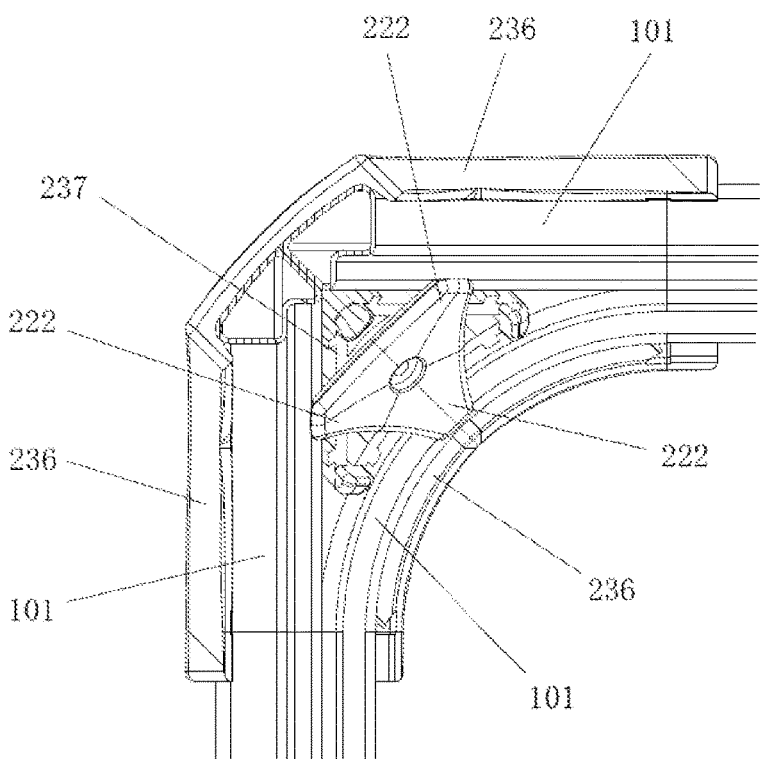
FIG. 20 is another partial schematic sectional view of the coupling assembly in FIG. 17.
Figure 21:
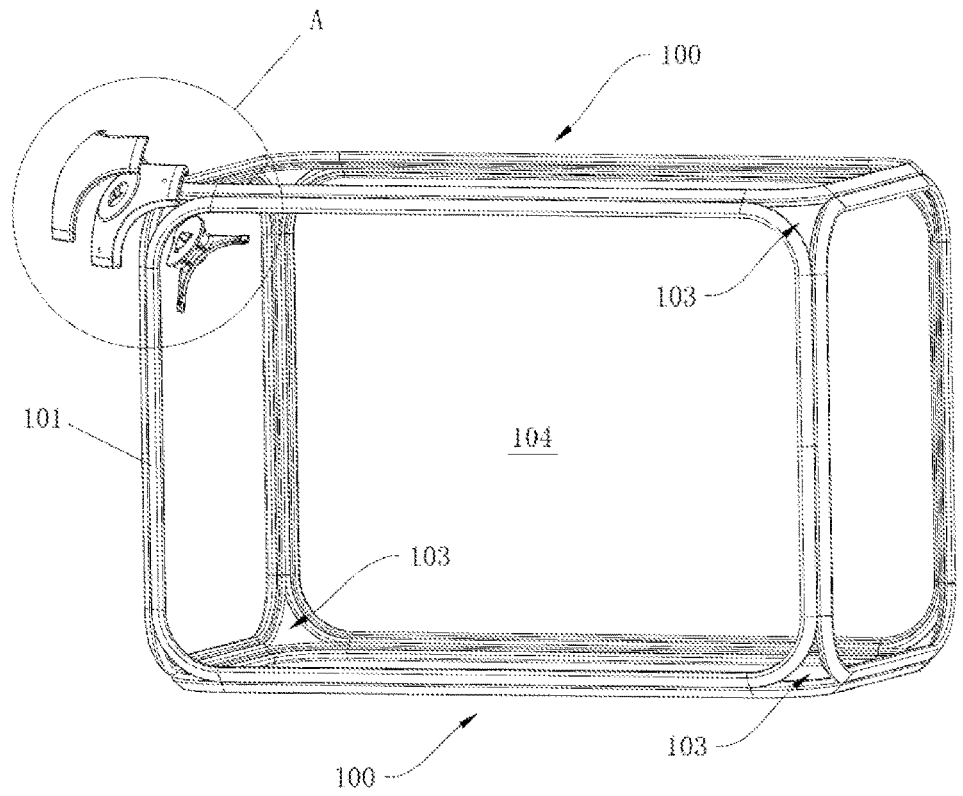
FIG. 21 is a schematic exploded view of a frame body and a set of connecting assembles of the pet cage in another embodiment.
Figure 22:
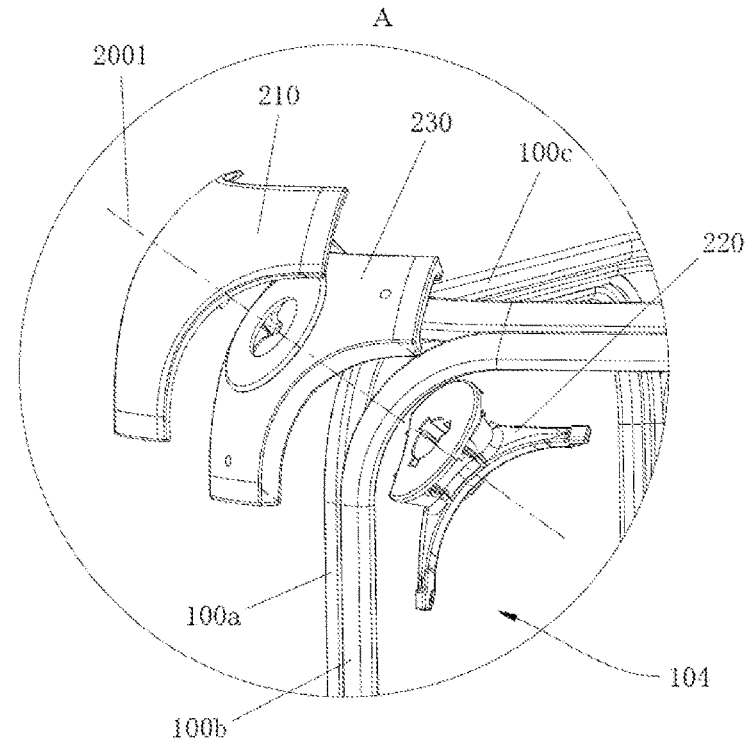
FIG. 22 is an enlarged schematic diagram at A in FIG. 21.
Figure 23:
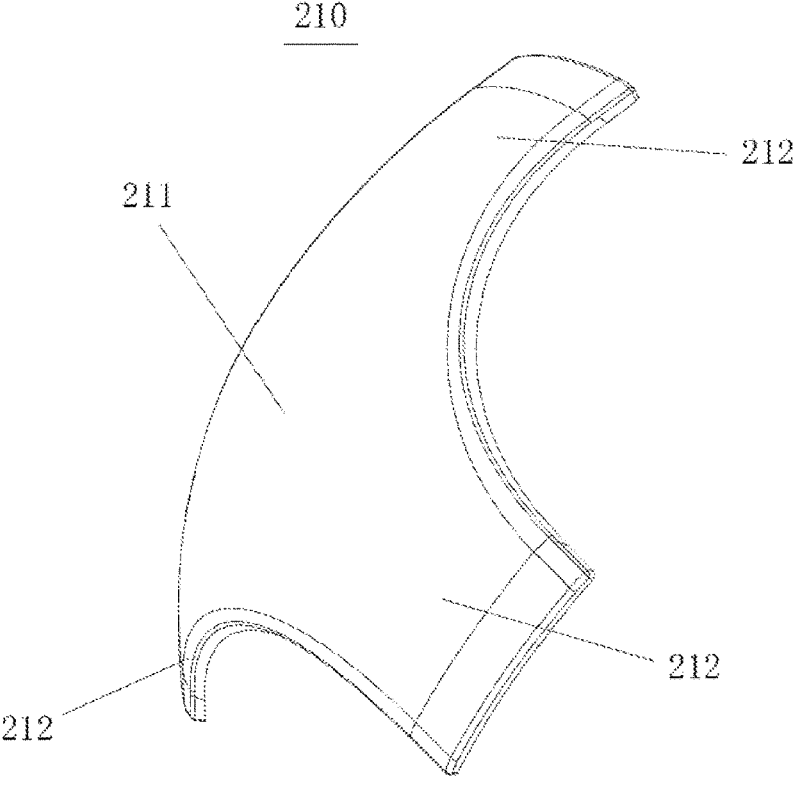
FIG. 23 is a three-dimensional schematic diagram of a first piece in the present embodiment.
Figure 24:
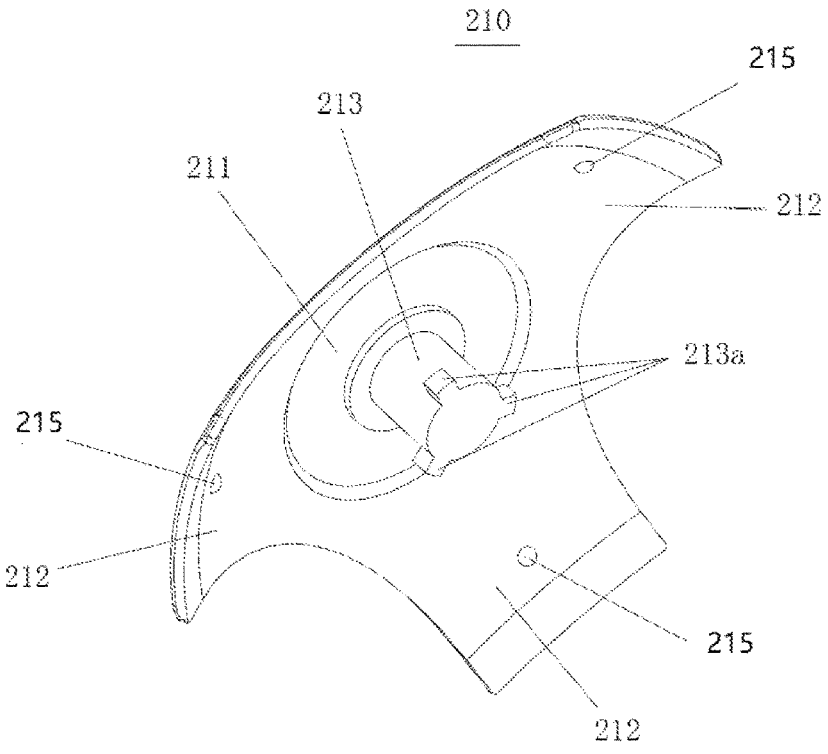
FIG. 24 is a three-dimensional schematic diagram of the first piece in another embodiment from another perspective.

Specifically, referring to FIG. 14 to FIG. 16, the first side frame 100a, the second side frame 100b and the third side frame 100c are first placed vertically in pairs according to preset positions. The connecting pore 103 is defined at the respective connecting struts 1013. A set of coupling assembly 200 are then inserted into the connecting pore 103 from the outer side of the containing space 104. The first piece 210 is located outside the containing space 104. The second piece 220 is located in the containing space 104. At this time, the first extension bodies 212 of the first piece 210 and the third extension bodies 232 of the third piece 230 are staggered, and each first positioning structure 215 is out of fit from the second positioning structure 235.

In the process of inserting the coupling assembly 200 into the connecting pore 103, the embedding portion 237 of the third piece 230 corresponds to the connecting pore 103 in terms of shape and position, and the second piece 220 approximately overlaps with the embedding portion 237. The second extension body 222 can be contained in a gap between the first side frame 100a and the second side frame 100b, a gap between the first side frame 100a and the third side frame 100c, and a gap between the second side frame 100b and the third side frame 100c, respectively. At the same time, the frame bodies 101 of the first side frame 100a, the second side frame 100b and the third side frame 100c are coupled and fixed in pairs by three sets of coupling grooves 236a of the third piece 230, thereby realizing preliminary positioning of the three side frames 100.

Referring to FIG. 17 to FIG. 20, after the frame bodies 101 are coupled by the third piece 230, the user can drive the first piece 210 to rotate around the rotation centerline 2001 at a rotation angle of about 60°, and the second piece 220 fixedly connected to the first piece can also rotate around the rotation centerline 2001 synchronously. As a rotating member rotates, the third piece 230 remains coupled with the side frames 100 without rotation until each first positioning structure 215 falls exactly into the second positioning structure 235, such that the first piece 210 limits the third piece 230 from continuing to rotate relatively. At this time, the user can feel a significant rotation resistance to stop rotation, and the first piece 210 on the surface has rotated to the assembled position.

Referring to FIG. 17 to FIG. 20, when the coupling assembly 200 are in the assembled state, the three second extension bodies 222 at this time abut against the first side frame 100a, the second side frame 100b and the third side frame 100c respectively, so that the second piece 220 can limit the coupling assembly 200 from being separated from the connection pore 103. The three side frames 100 are stably connected by the coupling assembly 200. At this time, around the circumference of the rotation centerline 2001, the three first extension bodies 212 are exactly in one-to-one correspondence to the three third extension bodies 232 in terms of position, so that the appearance of the coupling assembly 200 is also very concise, and integrated with the cuboid shape of the pet cage, without unnecessary edges and corners. In the present embodiment, the first piece 210 has an approximately spherical outer surface which can be smoothly connected with each frame body 101, without obvious edges and corners. Meanwhile, the coupling assembly 200 can play a protective role to corners of the pet cage and make the pet cage not easy to collide and damage, and a person or pet outside the pet cage will not be bruised by sharp edges and corners, thereby further improving the durability and convenience of the pet cage.

For the other side frames 100 of this pet cage, the installation of all six side frames 100 can be completed conveniently and fast just by repeating the above steps.

Conversely, when the user needs to disassemble this pet cage, the coupling assembly 200 need to be disassembled one by one. Also taking the above set of coupling assembly 200 as an example, the first piece 210 is driven first to rotate about 60° reversely around the rotation centerline 2001. During rotation, the user needs to exert a little force, and then the first positioning structure 215 is out of fit from the second positioning structure 235 by applying a driving force that is greater than a resistance between the first positioning structure 215 and the second positioning structure 235. At this time, the coupling assembly 200 is switched into the disassembled state. The coupling assembly 200 as a whole can be pulled out of the connecting pore 103 outward. After all the coupling assembly 200 are converted to the disassembled state, all side frames 100 can be separated from each other for easy storage.

In summary, the pet cage provided by the present embodiment has the connection assemblies 200 that are concise in structure, convenient to use, and capable of achieving the rapid assembly and disassembly of all side frames 100. The pet cage has a stable structure during assembly. The pet cage after disassembly can be flatly stored, which greatly facilitates packaging, storage and transportation.

In the above embodiment, the first piece 210 cooperates with the second piece 220 in a fixedly connected mode. The first piece 210 may also cooperate with the second piece 220 in a detachable fit mode. In the second mode, as shown in FIGS. 21 to 38, the second piece 220 also includes a second main body 221 and second extension bodies 222 extending outward from the second main body 221. The second extension bodies 222 are provided in the containing space 104 and abut against at least one of the first side frame 100a, the second side frame 100b and the third side frame 100c, so as to limit the second piece 220 from moving in an axial direction of the rotation centerline 2001 towards a direction away from the containing space 104.

In the present embodiment, the second extension body 222 is positioned between any two of the first side frame 100*a*, the second side frame 100*b* and the third side frame 100*c*, and can be embedded into a groove formed between the adjacent two frame bodies 101. Specifically, the first side frame 100*a*, the second side frame 100*b* and the third side frame 100*c* are adjacent in pairs to each other, and the second extension body 222 is coupled between every two of the side frames.

As shown in FIG. 22 to FIG. 26, a limiting structure is provided between the first connecting portion 213 and the second main body 221. The limiting structure includes convex portions 213, first groove 223*a* and second groove 223*b*. One of the first connecting portion 213 and the second main body 221 is provided with the convex portions 213*a*, and the other is provided with the first groove 223*a* and the second groove 223*b*. The first groove 223*a* are provided to extend in the extending direction of the rotation centerline 2001. The second groove 223*b* are provided to extend in a circumferential direction of the rotation centerline 2001, and are communicated with the first groove 223*a*.

When the coupling assembly 200 are switched from the disassembled state to the assembled state, the convex portions 213*a* first slide in an extending direction of the first groove 223*a* to be positionally opposite to the second groove 223*b*, and then a convex portion 213*a* rotates to the second groove 223*b* in the circumferential direction of the rotation centerline 2001. After the convex portion 213*a* rotates to the second groove 223*b*, the first connecting portion 213 is limited from moving in the axial direction of the rotation centerline 2001 towards a direction away from the containing space 104. It may be understood that the second groove 223*b* is provided with an oblique guide surface. The oblique guide surface can guide the convex portion 213 to slide towards the second groove 223*b*, and tension the second piece 220 in the sliding process, so that the second piece 220 is in pressing fit to the side frame 100.

Figure 25:
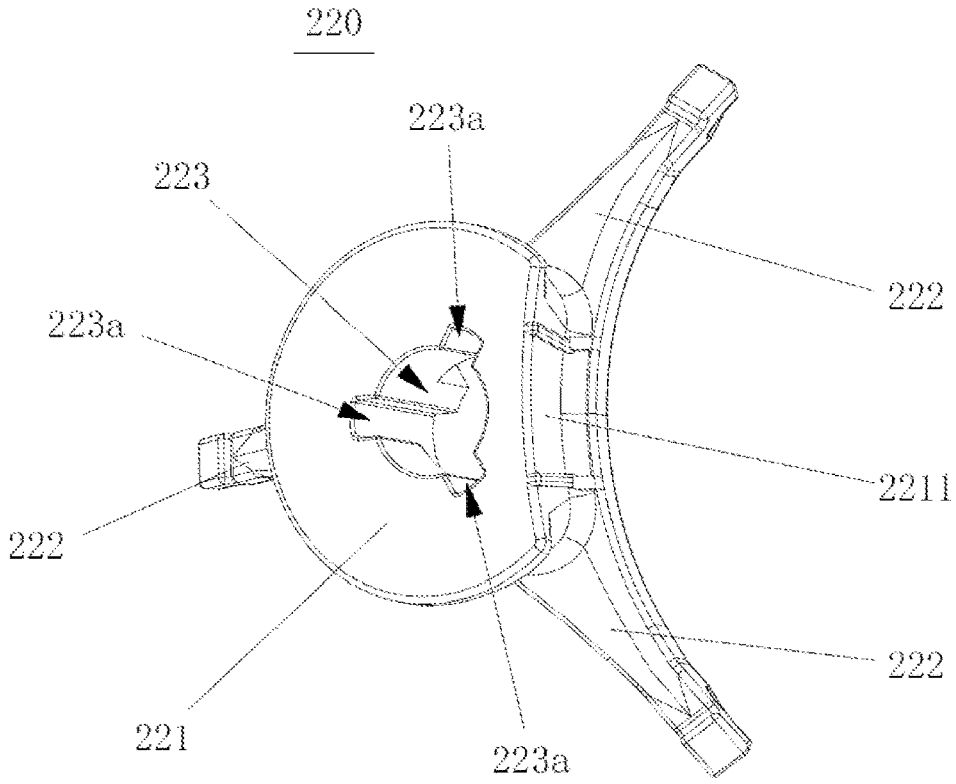
FIG. 25 is a three-dimensional schematic diagram of a second piece in another embodiment.
Figure 26:
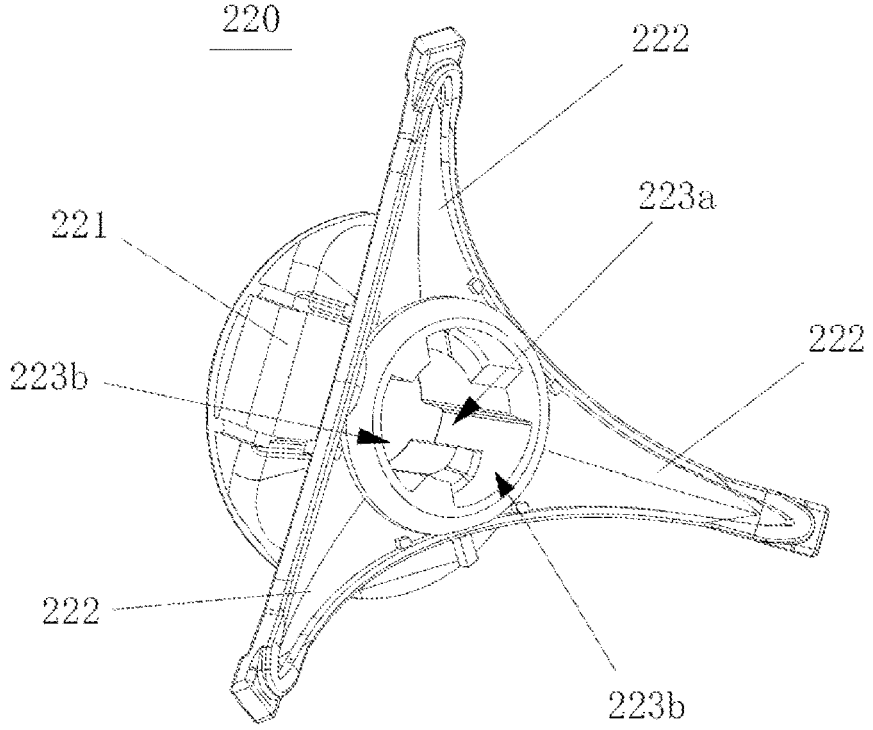
FIG. 26 is a three-dimensional schematic diagram of the second piece in another embodiment from another perspective.
Figure 27:
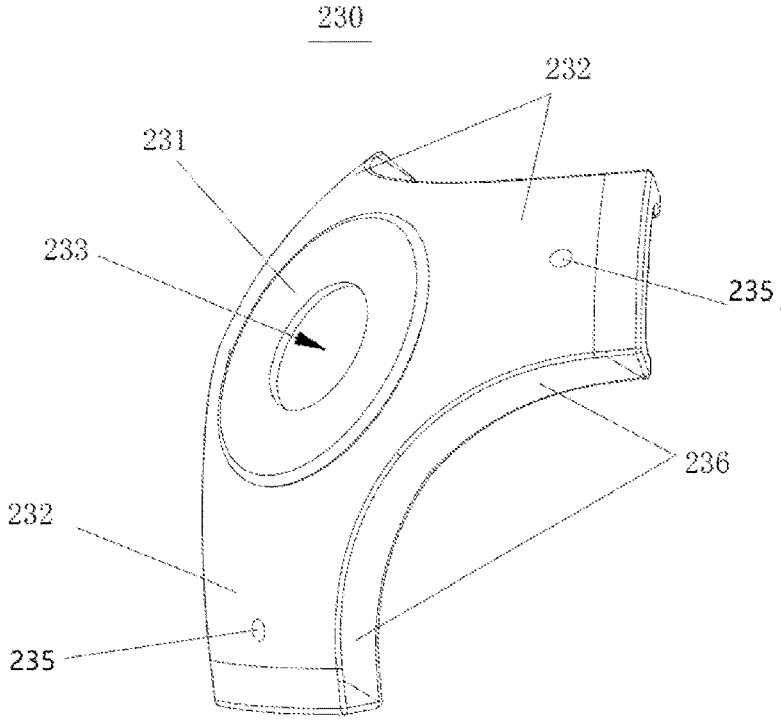
FIG. 27 is a three-dimensional schematic diagram of a third piece in another embodiment.
Figure 28:
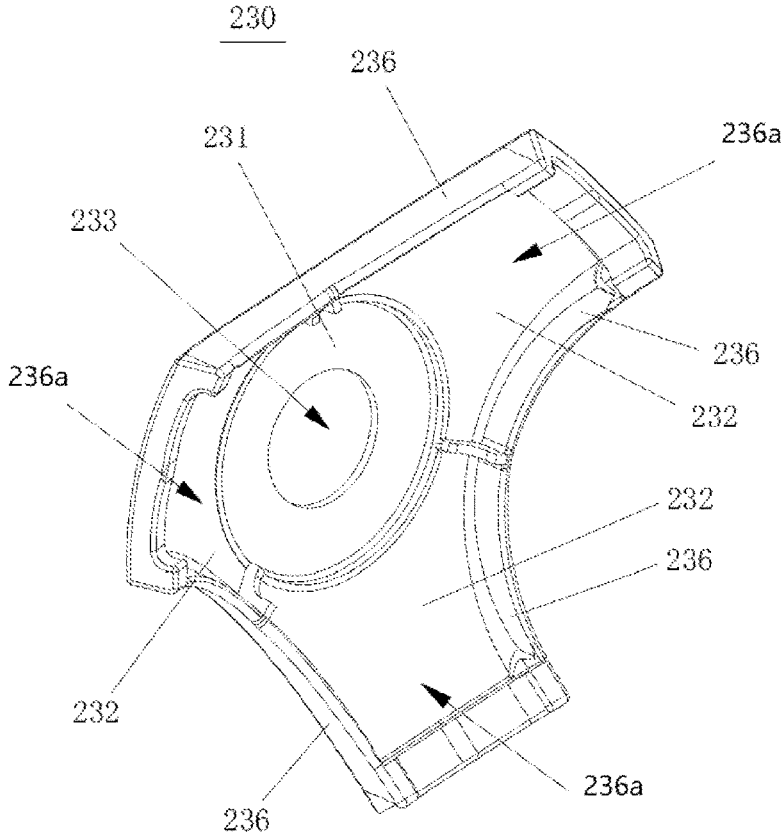
FIG. 28 is a three-dimensional schematic diagram of the third piece in another embodiment from another perspective.
Figure 29:
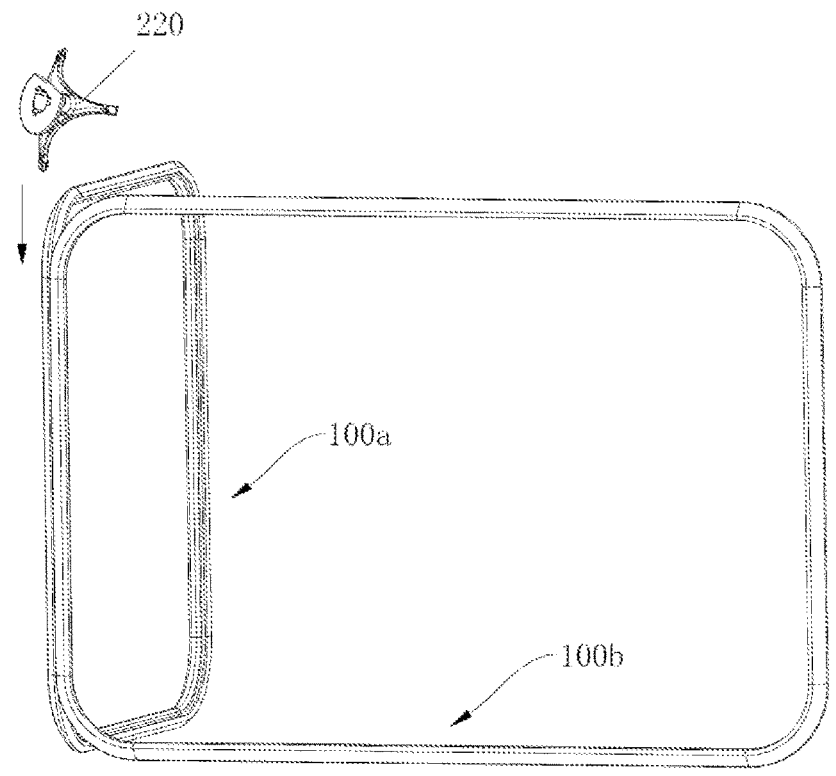
FIG. 29 is a schematic diagram of an assembling process of the coupling assembly in another embodiment.
Figure 30:
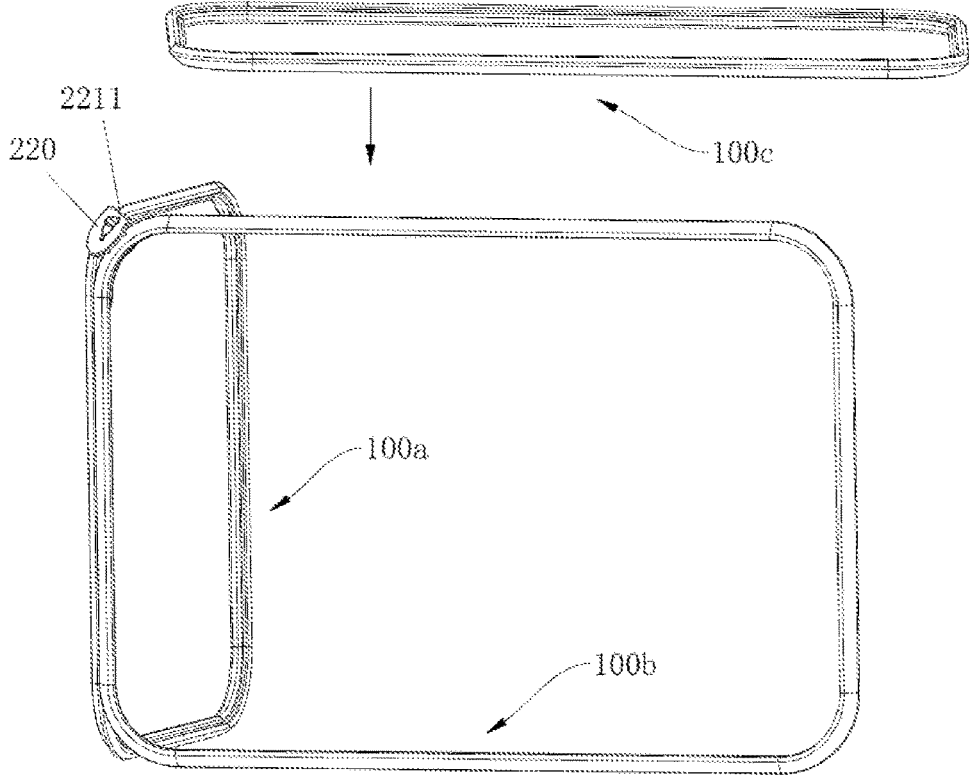
FIG. 30 is a schematic diagram of a further assembling process of the coupling assembly in another embodiment.
Figure 31:
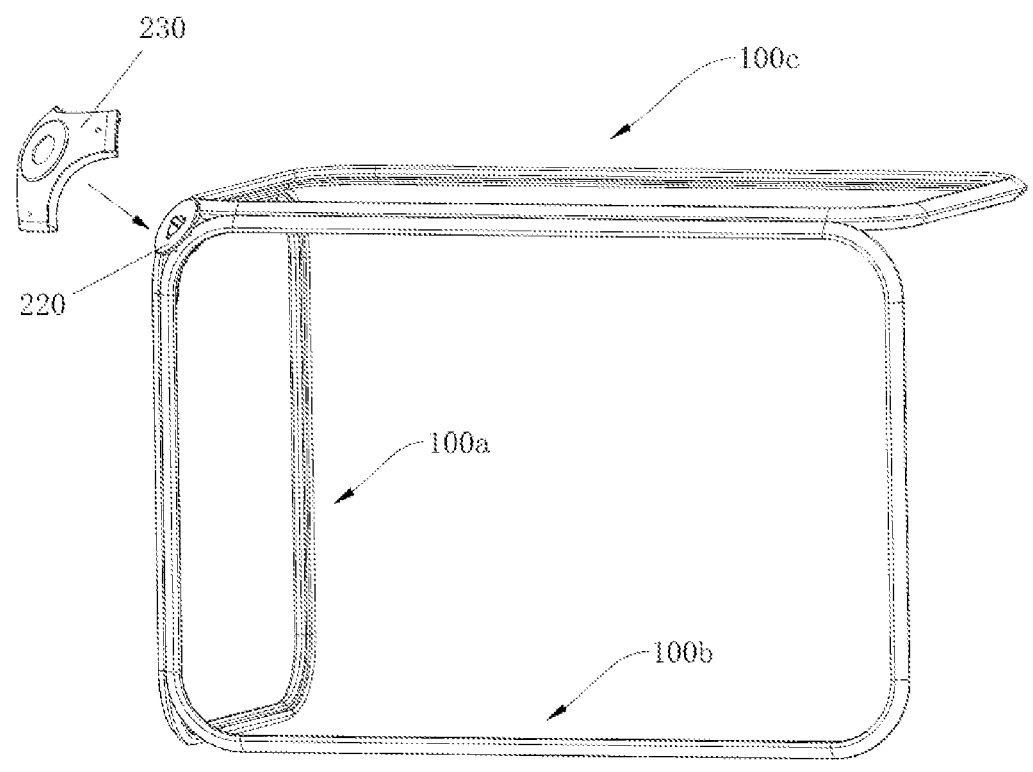
FIG. 31 is a schematic diagram of an even further assembling process of the coupling assembly in another embodiment.
Figure 32:
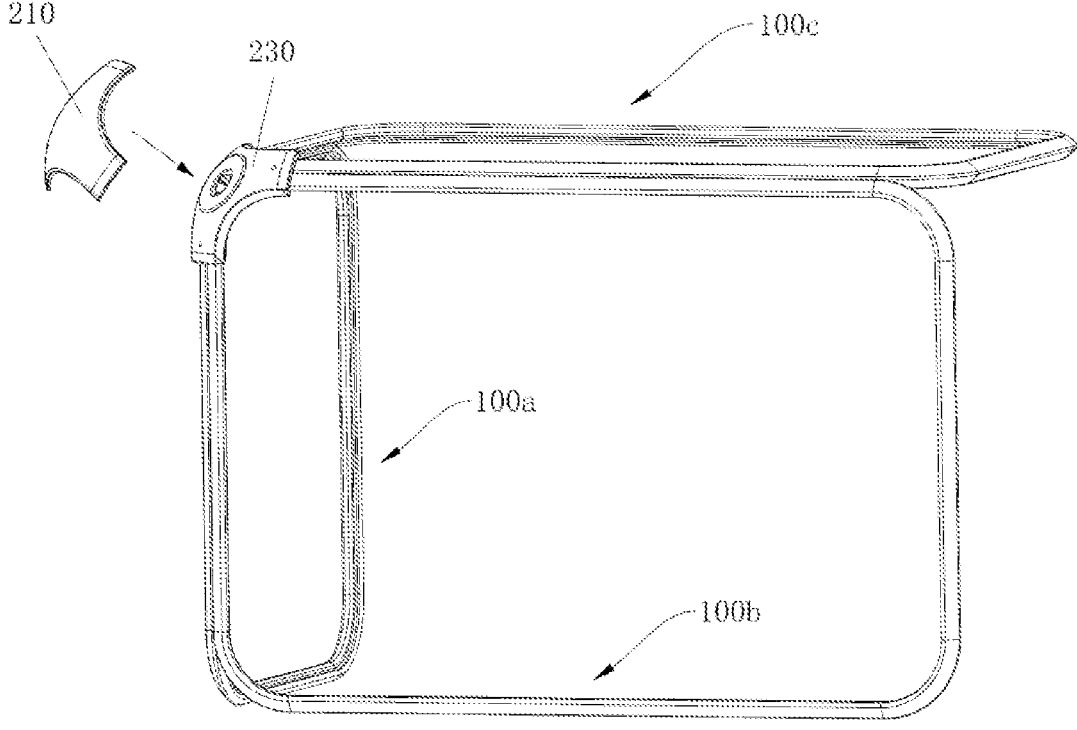
FIG. 32 is a schematic diagram of a yet further assembling process of the coupling assembly in another embodiment.
Figure 33:
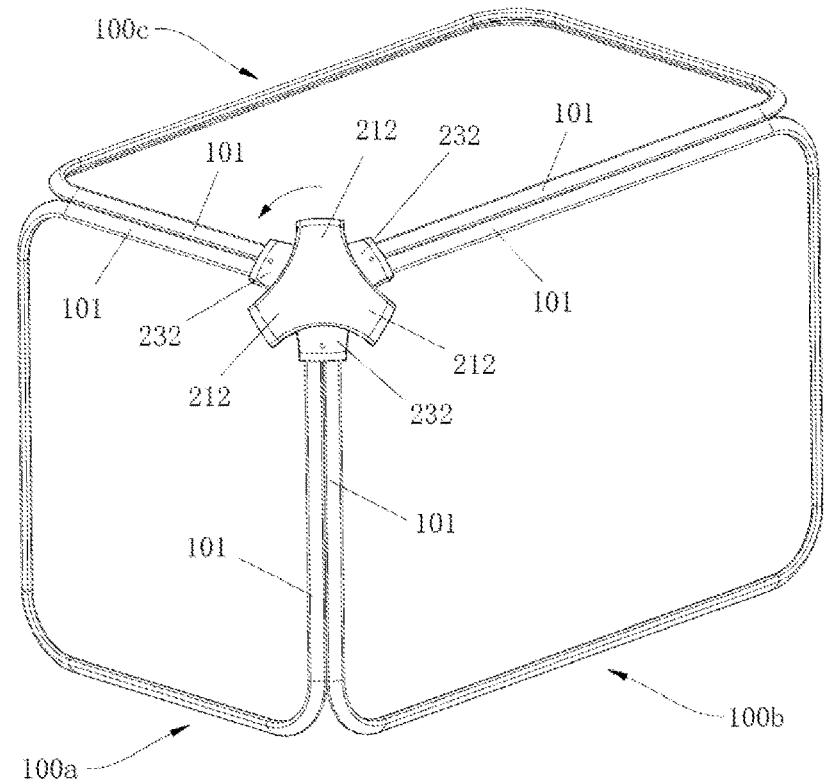
FIG. 33 is a schematic diagram of a still further assembling process of the coupling assembly in another embodiment.
Figure 34:
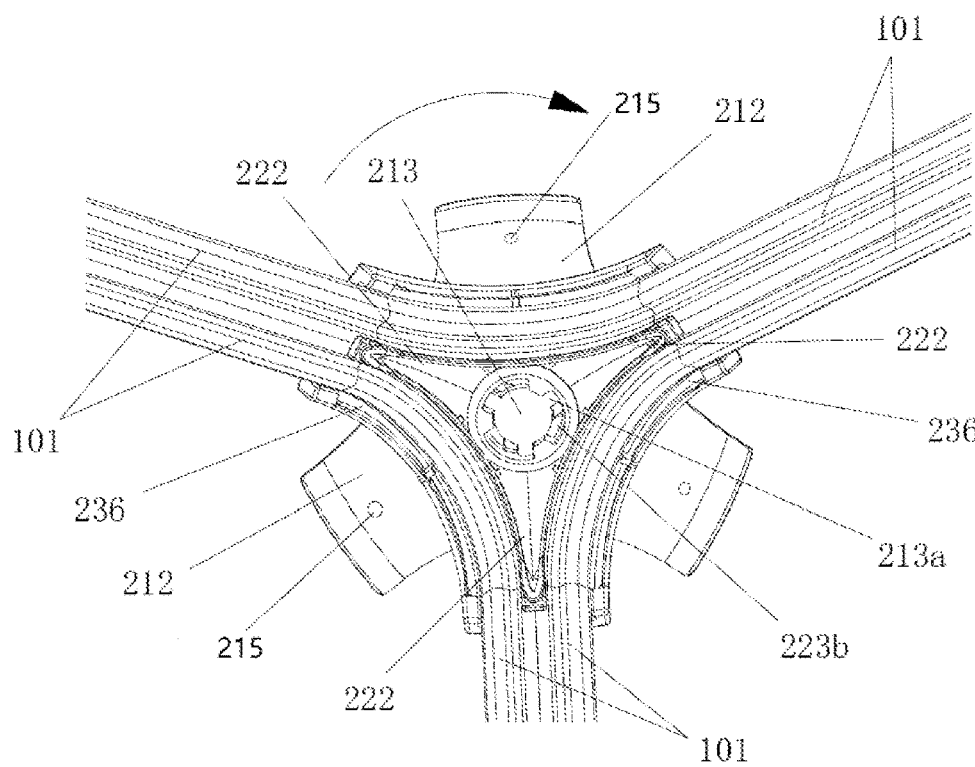
FIG. 34 is a partial three-dimensional schematic diagram of the coupling assembly and the frame body in FIG. 33 from another perspective.
Figure 35:
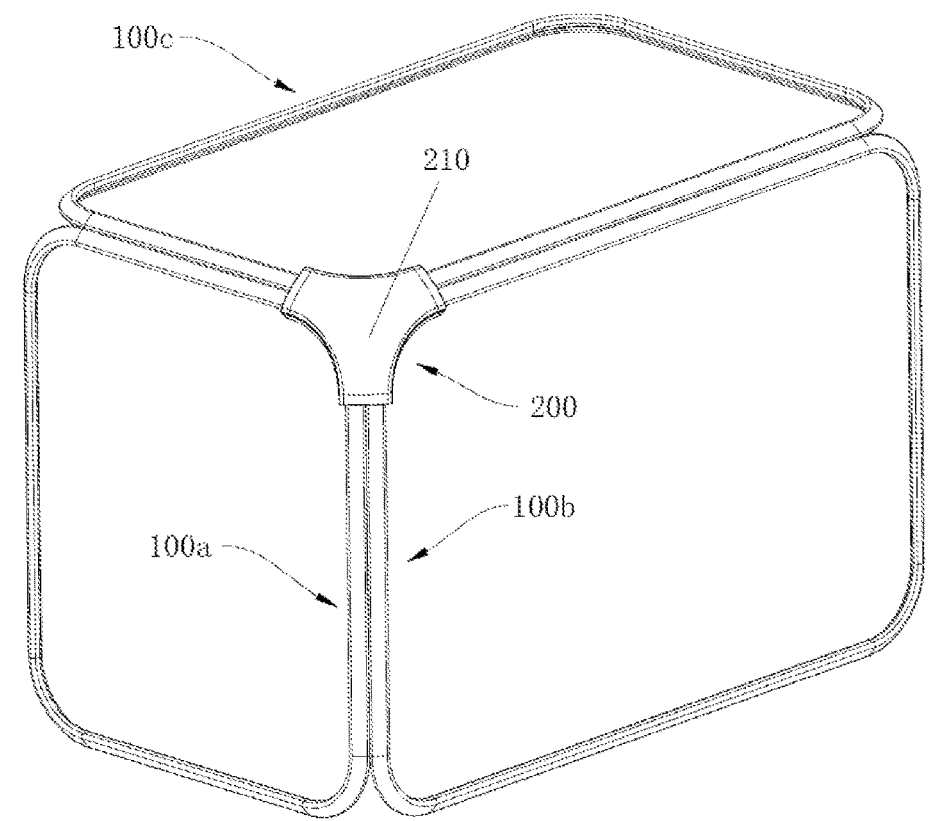
FIG. 35 is a three-dimensional schematic diagram of the coupling assembly in an assembled state in another embodiment.
Figure 36:
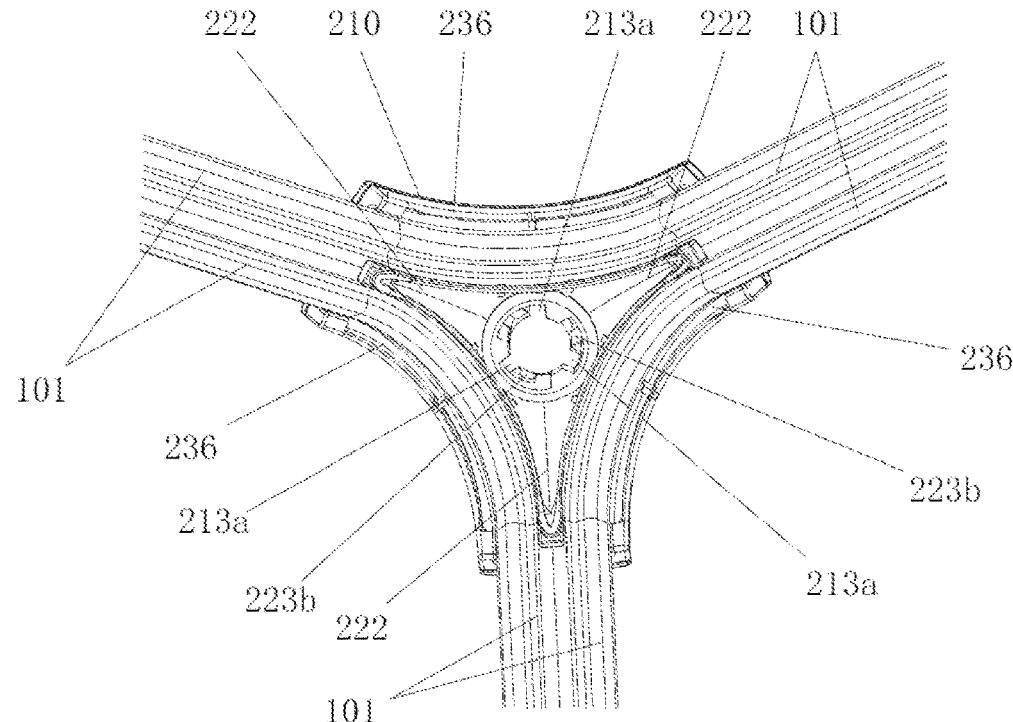
FIG. 36 is a partial three-dimensional schematic diagram of the coupling assembly and the frame body in FIG. 35 from another perspective.
Figure 37:
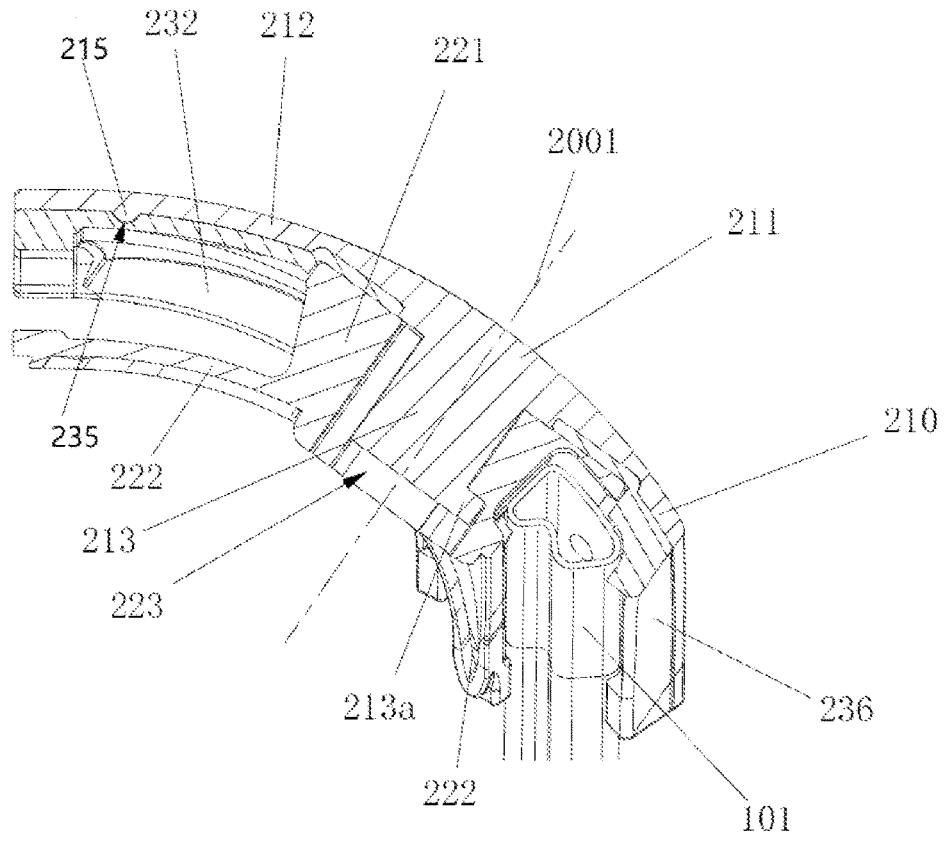
FIG. 37 is a partial schematic sectional view of the coupling assembly and the frame body in FIG. 35.
Figure 38:
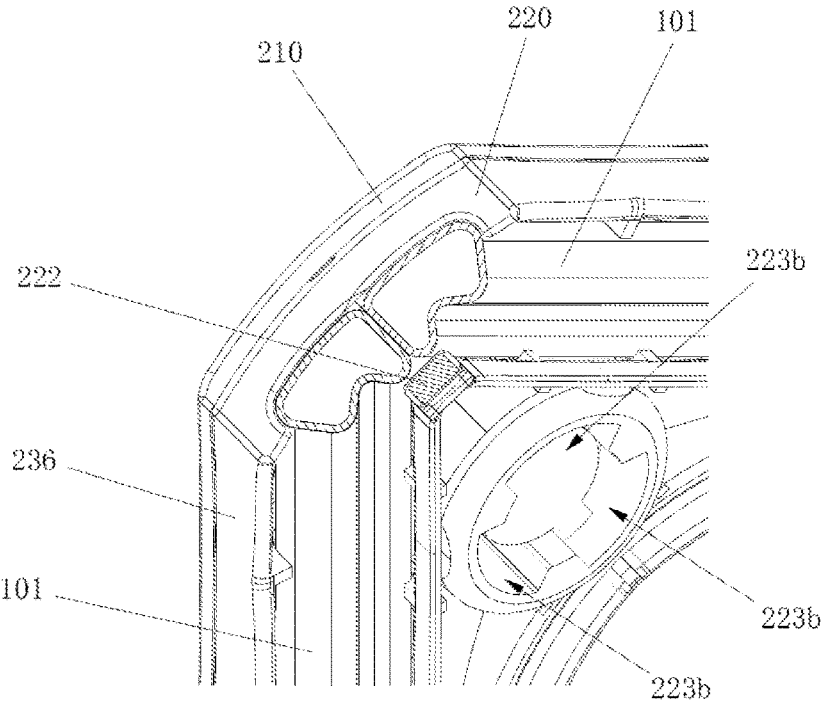

As shown in FIG. 25 to FIG. 26, when the convex portions 213*a* are provided on the first connecting portion 213, the second main body 221 is provided with an insertion groove 223 matched with the first connecting portion 213, and the first groove 223*a* and the second groove 223*b* are recessed in an inner wall of the insertion groove 223*b* respectively.

A plurality of convex portions 213*a* is provided. The plurality of convex portions 213*a* is arranged in a circumferential direction of the first connecting portion 213. Correspondingly, a plurality of first groove 223*a* and a plurality of second groove 223*b* are also provided. In other embodiments, the convex portion 213*a* may also be provided on the second main body 221, and the first groove 223*a* and the second groove 223*b* are formed in the first connecting portion 213.

The second main body 221 is provided to extend toward the connecting pore 103 and located in the connecting pore 103, and a limiting plate is formed at one end of the second main body 221 away from the second extension body 222. After the second main body 221 is positioned in the connecting pore 103, the limiting plate is relatively provided outside the containing space 104, and the limiting plate and the second extension body 222 are respectively located on both sides of the connecting pore 103. A positioning groove is formed between the limiting plate and the second extension body 222, which facilitates the positioning of the second main body 221 in the connecting pore 103.

As shown in FIG. 25, in order to facilitate assembly and fixation, an avoiding surface 2211 is formed on the second main body 221. A plane where the avoiding surface 2211 is located is parallel to an extending direction of the second main body 221. The avoiding surface 2211 is provided to prevent the second main body 221 from interference to the connection of the adjacent three side frames 100. The avoiding surface 2211 provides an assembly space for the third side frame 100*c*. In other embodiments, the avoiding function can be achieved by changing the shape of the second main body 221.

As shown in FIG. 29 to FIG. 38, the assembly way of the pet cage in which the first piece 210 cooperates with the second piece 220 in the second mode at least differs from the assembly way using the first mode in that: when the first piece 210 is coupled into the connecting pore 103 of a connecting space from the outer side of the containing space 104, the first connecting portion 213 passes through the connecting hole 233 and is inserted into the insertion groove 223, and the three convex portions 213*a* of the first connecting portion 213 slide along the first groove 223*a* respectively and enter the corresponding second groove 223*b*. At this time, the first piece 210 and the second piece 220 are in the assembled state, and each first extension body 212 and the third extension body 232 are staggered. In the first mode, the first piece 210 and the second piece 220 rotate synchronously. In the second mode, the first piece 210 and the second piece 220 do not rotate synchronously.

The above embodiments are only to illustrate the technical conception and characteristics of the invention, and are intended to enable those skilled in the art to understand the content of the invention and to implement it accordingly, but not intended to limit the protection scope of the invention. The equivalent changes or modifications made according to the spiritual essence of the invention shall be covered by the protection scope of the invention.

The invention claimed is:

1. A pet cage, comprising a plurality of side frames which define a containing space, the plurality of side frames at least comprise a first side frame, a second side frame and a third side frame to define a connecting pore; the connecting pore is communicated with the containing space; and a coupling assembly having an assembled state and a disassembled state;

when the coupling assembly is in the disassembled state, the coupling assembly is separable from the connecting pore;

when the coupling assembly is in the assembled state, at least part of the coupling assembly is located in the connecting pore, and the first side frame, the second side frame and the third side frame are positioned and connected together by the coupling assembly;

wherein the coupling assembly comprises a first piece, a second piece and a third piece; when the coupling assembly is in the assembled state, part of the first piece penetrates through the connecting pore, and both ends of the first piece cooperate with the second piece and the third piece respectively, so that part of the first side frame, part of the second side frame and part of the third side frame are simultaneously pressed between the second piece and the third piece; and when the coupling assembly is in the disassembled state, the first piece is separable from the connecting pore;

wherein a rotation centerline is provided in a penetration direction of the connecting pore; the first piece comprises a first connecting portion provided to extend towards the connecting pore; the first connecting portion is capable of relatively rotating around the rotation centerline to cooperate with the connecting pore; the first piece rotates between a disassembled position where the first connecting portion is capable of relatively moving in an extending direction of the rotation centerline and the coupling assembly is in the disassembled state, and an assembled position where the first connecting portion cooperates with the second piece to restrain the first piece from moving in the extending direction of the rotation centerline;

wherein the second piece comprises a second main body and a second extension body extending outward from the second main body; the second extension body is provided within the containing space and abuts against at least one of the first side frame, the second side frame and the third side frame, so as to restrain the second piece from moving in an axial direction of the rotation centerline towards a direction away from the containing space; a limiting structure is provided between the first connecting portion and the second main body; the limiting structure comprises a convex portion, a first groove and a second groove; one of the first connecting portion and the second main body is provided with the convex portion, and the other one of the first connecting portion and the second main body is provided with the first groove and the second groove; the first groove extends in an extending direction of the rotation centerline; the second groove extends in a circumferential direction of the rotation centerline and communicates with the first groove; and when the coupling assembly is switched from the disassembled state to the assembled state, the convex portion first slides in an extending direction of the first groove to be positionally opposite to the second groove, and then the convex portion rotates to the second groove in the circumferential direction of the rotation centerline where the first connecting portion is restrained from moving away from the containing space along the axial direction of the rotation centerline.

2. The pet cage according to claim 1, wherein the convex portion is provided on the first connecting portion, the second main body is provided with an insertion groove coordinated with the first connecting portion, and the first groove and the second groove are respectively recessed in an inner wall of the insertion groove; and a plurality of convex portions are provided along a circumferential direction of the first connecting portion; and correspondingly, a plurality of first grooves and a plurality of second grooves are also provided.

3. The pet cage according to claim 1, wherein a limiting plate is formed at one end of the second main body away from the second extension body, the second main body is provided to extend toward the connecting pore and positioned in the connecting pore where the limiting plate is outside the containing space, and the limiting plate and the second extension body are respectively located on both sides of the connecting pore.

4. The pet cage according to claim 3, an avoiding surface is formed on the second main body, and a plane where the avoiding surface is located is parallel to an extending direction of the second main body.

5. The pet cage according to claim 1, wherein a third main body and a plurality of third extension bodies extending outward from the third main body are formed on the third piece; each of the third extension bodies is provided with a coupling groove; and when the coupling assembly is in the assembled state, the two adjacent side frames are coupled and fixed to each other by the third extension body.

6. The pet cage according to claim 5, wherein the third main body is provided with a connecting hole; the first connecting portion penetrates through the connecting hole and is in rotating fit with the connecting hole; and the first connecting portion is provided with a first extension portion, and the first extension portion abuts against the third main body in the assembled position, so as to restrain the first connecting portion from moving toward the containing space.

7. The pet cage according to claim 6, wherein one of the first piece and the third piece is provided with a guiding groove, and the other one of the first piece and the third piece is provided with a guide pillar; the guide pillar is slidably disposed in the guiding groove; and an extending direction of the guiding groove is an arc with the rotation centerline as a centerline.

8. The pet cage according to claim 6, wherein the first piece has a first positioning structure, the third piece has a second positioning structure, and the first positioning structure is in damping fit with the second positioning structure; when the coupling assembly is in the disassembled state, the first positioning structure is out of fit from the second positioning structure; and when the coupling assembly is in the assembled state, the first positioning structure and the second positioning structure cooperate with each other to restrain the first piece from rotating relative to the third piece.

* * * * *